(12) United States Patent
Aldred et al.

(10) Patent No.: US 8,006,827 B2
(45) Date of Patent: Aug. 30, 2011

(54) TRANSPORTING PARTICULATE MATERIAL

(75) Inventors: Derek Leslie Aldred, North Hollywood, CA (US); Jeffrey A. Rader, North Hollywood, CA (US); Timothy W. Saunders, North Hollywood, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/565,269

(22) Filed: Sep. 23, 2009

(65) Prior Publication Data
US 2010/0021247 A1 Jan. 28, 2010

Related U.S. Application Data

(63) Continuation of application No. PCT/US2008/060593, filed on Apr. 17, 2008.

(60) Provisional application No. 60/925,366, filed on Apr. 20, 2007, provisional application No. 60/942,418, filed on Jun. 6, 2007.

(51) Int. Cl.
*B65G 31/00* (2006.01)
(52) U.S. Cl. .................. 198/638; 198/564; 198/642
(58) Field of Classification Search .................. 198/624, 198/638, 642, 564, 640; 406/71
See application file for complete search history.

(56) References Cited

U.S. PATENT DOCUMENTS

| | | | | |
|---|---|---|---|---|
| 1,576,366 A | * | 3/1926 | Schieldrop | 209/637 |
| 3,136,405 A | * | 6/1964 | Kulla | 198/564 |
| 3,332,534 A | * | 7/1967 | Mills | 198/547 |
| 3,653,951 A | * | 4/1972 | Maldeis et al. | 427/140 |
| 3,710,925 A | * | 1/1973 | Dorman | 198/564 |
| 4,421,412 A | * | 12/1983 | Hold et al. | 366/76.93 |
| 4,516,674 A | * | 5/1985 | Firth | 198/617 |
| 4,597,491 A | * | 7/1986 | Conklin | 198/642 |
| 4,988,239 A | * | 1/1991 | Firth | 406/99 |
| 5,051,041 A | | 9/1991 | Firth | |

(Continued)

FOREIGN PATENT DOCUMENTS

JP 2005238117 A2 9/2005
(Continued)

OTHER PUBLICATIONS

Written Opinion of the International Searching Authority for PCT/US2008/060593.

*Primary Examiner* — Gene Crawford
*Assistant Examiner* — William R Harp
(74) *Attorney, Agent, or Firm* — Global Patent Operation; Douglas D. Zhang

(57) ABSTRACT

A material transporting system comprises a material transporting apparatus (100) including a material transporting apparatus hopper structure (200, 202), which comprises at least one rotary transporting apparatus; a stationary hub structure (900) constraining and assisting the at least one rotary transporting apparatus; an outlet duct configuration (700) configured to permit material to exit therefrom and comprising at least one diverging portion (702, 702'); an outlet abutment configuration (800) configured to direct material to the outlet duct configuration; an outlet valve assembly from the material transporting system venting the material transporting system; and a moving wall configuration in the material transporting apparatus capable of assisting the material transporting apparatus in transporting material in the material transporting system. Material can be moved from the material transporting apparatus hopper structure to the outlet duct configuration through the at least one rotary transporting apparatus, the outlet abutment configuration, and the outlet valve assembly.

19 Claims, 22 Drawing Sheets

U.S. PATENT DOCUMENTS

| | | | | |
|---|---|---|---|---|
| 5,355,993 | A * | 10/1994 | Hay | 198/642 |
| 5,381,886 | A * | 1/1995 | Hay | 198/642 |
| 5,402,876 | A | 4/1995 | Hay | |
| 5,485,909 | A * | 1/1996 | Hay | 198/642 |
| 5,497,873 | A * | 3/1996 | Hay | 198/642 |
| 5,551,553 | A * | 9/1996 | Hay | 198/624 |
| 6,213,289 | B1 | 4/2001 | Hay et al. | |
| 6,250,641 | B1 | 6/2001 | Dinc et al. | |
| 6,352,267 | B1 | 3/2002 | Rode | |
| 6,832,887 | B2 * | 12/2004 | Baer et al. | 415/90 |
| 7,044,288 | B2 * | 5/2006 | Baer et al. | 198/642 |
| 7,303,062 | B2 * | 12/2007 | Baer et al. | 198/642 |

FOREIGN PATENT DOCUMENTS

| | | |
|---|---|---|
| WO | 9429202 A1 | 12/1994 |
| WO | 9506610 A1 | 3/1995 |

\* cited by examiner

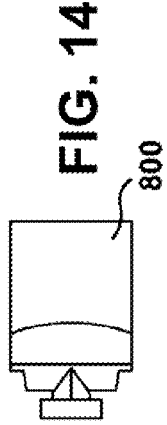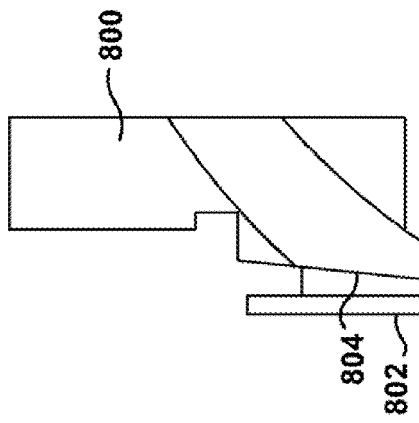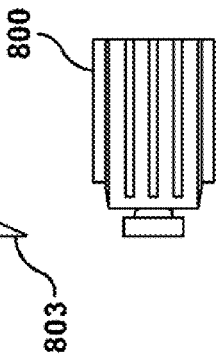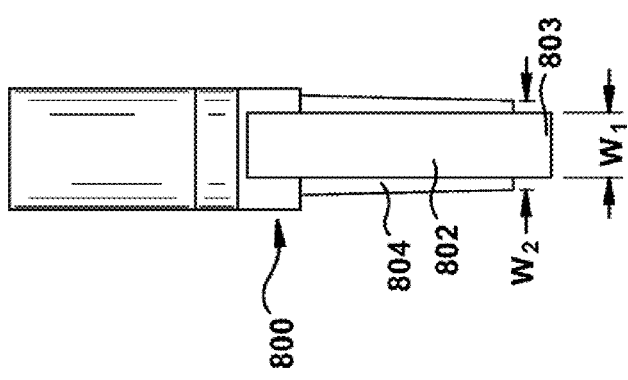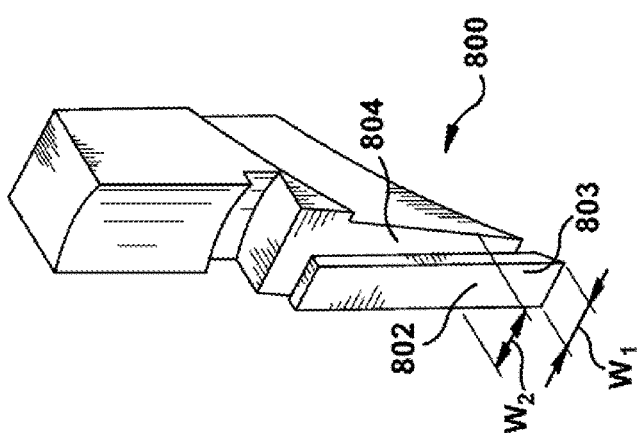

TRANSPORTING PARTICULATE MATERIAL

CROSS-REFERENCE TO RELATED APPLICATIONS

This is a continuation of PCT patent application number PCT/US2008/060593, filed on Apr. 17, 2008, which claims priority to U.S. provisional patent application Ser. No. 60/925,366, filed on Apr. 20, 2007, and U.S. provisional patent application Ser. No. 60/942,418, filed on Jun. 6, 2007, each of which is incorporated herein by reference in its entirety.

STATEMENT REGARDING FEDERALLY SPONSORED RESEARCH OR DEVELOPMENT

This invention was made with Government support under cooperative agreement under the authority of Public Law 95-91 DOE Organization Act, and P. L. 95-224 Federal Grant and cooperative Agreement Act as amended by P. L. 97-258 (Instrument No. DE-FC26-02NT41439) awarded by the United States Department of Energy. The Government may have certain rights in the invention.

BACKGROUND OF THE INVENTION

The invention relates, generally, to systems and apparatuses for transporting particulate material, components of such systems and apparatuses and methods of making and using such systems, apparatuses and components. Particular embodiments relate to such systems, apparatuses, components and methods, involving transporting particulate materials across a pressure differential, such as into or out of an increased pressure environment.

A wide variety of equipment has been used to either transport or meter particulate material (such as, but not limited to, coal, other mined materials, dry food products, other dry goods handled in solid, particle form). Such transport equipment includes conveyor belts, rotary valves, lock hoppers, screw-type feeders, etc. Exemplary measurement or metering devices include weigh belts, volumetric hoppers and the like. In order to provide both transport and metering of particulate material, it was typically necessary to use or combine both types of devices into a system.

However, some apparatuses were provided with the capability of both transporting and metering particulate material. Examples of such prior designs include the rotary disk type pumps discussed in the following U.S. patents: U.S. Pat. No. 4,516,674 (issued May 14, 1985); U.S. Pat. No. 4,988,239 (issued Jan. 29, 1991); U.S. Pat. No. 5,051,041 (issued Sep. 24, 1991); U.S. Pat. No. 5,355,993 (issued Oct. 18, 1994); U.S. Pat. No. 5,381,886 (issued Jan. 17, 1995);U.S. Pat. No. 5,402,876 (issued Apr. 4, 1995); U.S. Pat. No. 5,485,909 (issued Jan. 23, 1996); U.S. Pat. No. 5,497,873 (issued Mar. 12, 1996); U.S. Pat. No. 5,551,553 (issued Sep. 3, 1996); and U.S. Pat. No. 6,213,289 (issued Apr. 10, 2001).

There are many industrial and commercial contexts in which it is desirable to transport and/or meter particulate materials across a pressure differential, for example, against a pressure (e.g., wherein gas and/or fluid pressure at the output side of the transport system is greater than the gas and/or fluid pressure at the input side of the system). Examples of such contexts, include, but are not limited to, transporting coal or other particulate fuel or additives to furnaces in a power plant or other industrial facility, transporting coal or other particulate fuel or additive to gasification vessels or systems for the production of electrical power, or the production of synthetic liquid or gaseous fuels, transporting particulate products to cooking vessels for the production of food, chemicals, or other products, or the like.

Industrial and commercial scale operations of such transporting and/or metering apparatuses can result in significant issues relating to efficiency in usage costs, maintenance, wear on components and dust handling.

BRIEF DESCRIPTION OF THE INVENTION

One aspect of the invention provides a material transporting system comprises a material transporting apparatus including a material transporting apparatus hopper structure, which comprises at least one rotary transporting apparatus; a stationary hub structure constraining and assisting the at least one rotary transporting apparatus; an outlet duct configuration configured to permit material to exit therefrom and comprising at least one diverging portion; an outlet abutment configuration configured to direct material to the outlet duct configuration; an outlet valve assembly from the material transporting system venting the material transporting system; and a moving wall configuration in the material transporting apparatus capable of assisting the material transporting apparatus in transporting material in the material transporting system. Material can be moved from the material transporting apparatus hopper structure to the outlet duct configuration through the at least one rotary transporting apparatus, the outlet abutment configuration, and the outlet valve assembly.

Another aspect of the invention provides the material transporting system further comprising a dust collection system.

Another aspect of the invention provides the material transporting apparatus hopper structure comprises at least two hoppers.

A further aspect of the invention provides the material transporting apparatus hopper structure comprises at least one sensor, the at least one sensor sensing at least one of voids, density.

A still further aspect of the invention provides the material transporting apparatus hopper structure comprising at least one vibrator to vibrate the material transporting apparatus hopper structure and material therein.

A further aspect of the invention provides the material transporting apparatus hopper structure comprising pressurized destination environment to provide a buffer area to absorb back flow in the material transporting apparatus hopper structure.

A yet further aspect of the invention provides the at least one rotary transporting apparatus comprising a transport duct having an inlet and an outlet downstream of the inlet, and a primary transport channel located between the inlet and the outlet, the primary transport channel being defined by a pair of opposed moving surfaces which move between the inlet and the outlet towards the outlet, at least one of the moving surfaces having a series of discontinuities, each of the discontinuities configured to define a transport facilitation zone contiguous with the primary transport channel such that material within the transport facilitation zone is contiguous with material within the primary transport channel, each of the discontinuities having a downstream facing drive surface; and motive means for moving the movable surfaces between the inlet and the outlet towards the outlet; and at least one seal to reduce the passage of dust and debris from the material transporting apparatus hopper structure, while allowing the at least one rotary transporting apparatus to rotate relative to material transporting apparatus hopper structure.

In still another aspect of the invention provides the at least one rotary transporting apparatus comprises at least two disks, and the at least one seal comprises a bracket (604) and a seal (602), the bracket holding the seal.

Also, another aspect of the invention provides the at least one seal is mounted to one of the at least one rotary transporting apparatus and the material transporting apparatus hopper structure.

Moreover, another aspect of the invention provides the at least one seal comprises arc-shaped sections with overlapping extension portions.

Furthermore, another aspect of the invention provides the at least one seal comprises an orthogonally oriented brush seal configuration.

In a further aspect of the invention, the outlet duct configuration comprising at least one parallel section.

Additionally, an aspect of the invention the outlet duct configuration comprising multiple outlets, where in at least one of the multiple outlets comprises diverging cross sections.

Another further aspect of the invention provides the outlet abutment configuration that is configured to direct material to the outlet duct configuration comprises at least one stage surface to redirect material to the outlet duct configuration.

Further, another aspect of the invention provides the outlet abutment configuration that is configured to direct material to the outlet duct configuration comprises a material selected from metals and ceramics, and combinations thereof.

Another aspect of the invention provides the outlet abutment configuration (800) that is configured to direct material to the outlet duct configuration comprises an adjustable outlet abutment configuration.

In yet another aspect of the invention provides the outlet abutment configuration that is configured to direct material to the outlet duct configuration comprises at least one stage surface to redirect material to the outlet duct configuration, wherein each at least one stage surface corresponds to a transport facilitation zone of the at least one rotary transporting apparatus.

Moreover, the invention herein sets forth another aspect of the invention including the moving wall configuration comprises a belt defining at least a portion of the material transporting system, the belt being supported around a plurality of pulleys, the moving wall configuration assisting transporting material in the material transporting system.

A further aspect of the invention herein, provides a dust collection system; the material transporting apparatus hopper structure comprises at least two hoppers; wherein the material transporting apparatus hopper structure comprises at least one sensor, the at least one sensor sensing at least one of voids, density; further wherein the material transporting apparatus hopper structure comprises at least one vibrator to vibrate the material transporting apparatus hopper structure and material therein; wherein the material transporting apparatus hopper structure comprises pressurized destination environment to provide a buffer area to absorb back flow in the material transporting apparatus hopper structure; and the at least one rotary transporting apparatus comprises: a transport duct having an inlet and an outlet downstream of the inlet, and a primary transport channel located between the inlet and the outlet, the primary transport channel being defined by a pair of opposed moving surfaces which move between the inlet and the outlet towards the outlet, at least one of the moving surfaces having a series of discontinuities, each of the discontinuities configured to define a transport facilitation zone contiguous with the primary transport channel such that material within the transport facilitation zone is contiguous with material within the primary transport channel, each of the discontinuities having a downstream facing drive surface; motive means for moving the movable surfaces between the inlet and the outlet towards the outlet; and at least one seal to reduce the passage of dust and debris from the material transporting apparatus hopper structure, while allowing the at least one rotary transporting apparatus to rotate relative to material transporting apparatus hopper structure; wherein the at least one rotary transporting apparatus comprises at least two disks, and the at least one seal comprises a bracket and a seal, the bracket holding the seal; and the at least one seal is mounted to one of the at least one rotary transporting apparatus and the material transporting apparatus hopper structure and comprises arc-shaped sections with overlapping extension portions the at least one seal comprises an orthogonally oriented brush seal configuration; wherein the outlet duct configuration comprising at least one parallel section and multiple outlets, wherein at least one of the multiple outlets comprises diverging cross sections; and the outlet abutment configuration that is configured to direct material to the outlet duct configuration comprises at least one stage surface to redirect material to the outlet duct configuration and comprises a material selected from metals and ceramics, and combinations thereof and further is configured to direct material to the outlet duct configuration comprises an adjustable outlet abutment configuration, and wherein the moving wall configuration comprises a belt defining at least a portion of the material transporting system, the belt being supported around a plurality of pulleys, the moving wall configuration assisting transporting material in the material transporting system These and other aspects, advantages and salient features of the invention will become apparent from the following detailed description, which, when taken in conjunction with the annexed drawings, where like parts are designated by like reference characters throughout the drawings, disclose embodiments of the invention.

BRIEF DESCRIPTION OF THE DRAWINGS

FIGS. 11-15 are perspective, side, front, top and bottom views, respectively of an outlet abutment insert according to an embodiment of the invention.

DETAILED DESCRIPTION OF THE INVENTION

The following detailed description is of the best presently contemplated mode of carrying out the invention. This description is not to be taken in a limiting sense, but is made merely for the purpose of illustrating general principles of embodiments of the invention.

The invention relates generally to systems, apparatuses and methods for transporting and metering particulate material. Particular embodiments of the invention relate to apparatuses that employ general rotary disk principles such, but not limited to those described in, for example, one or more of U.S. Pat. Nos. 5,355,993, 5,381,886, 5,402,876 and 6,213,289.

Figure 1A:
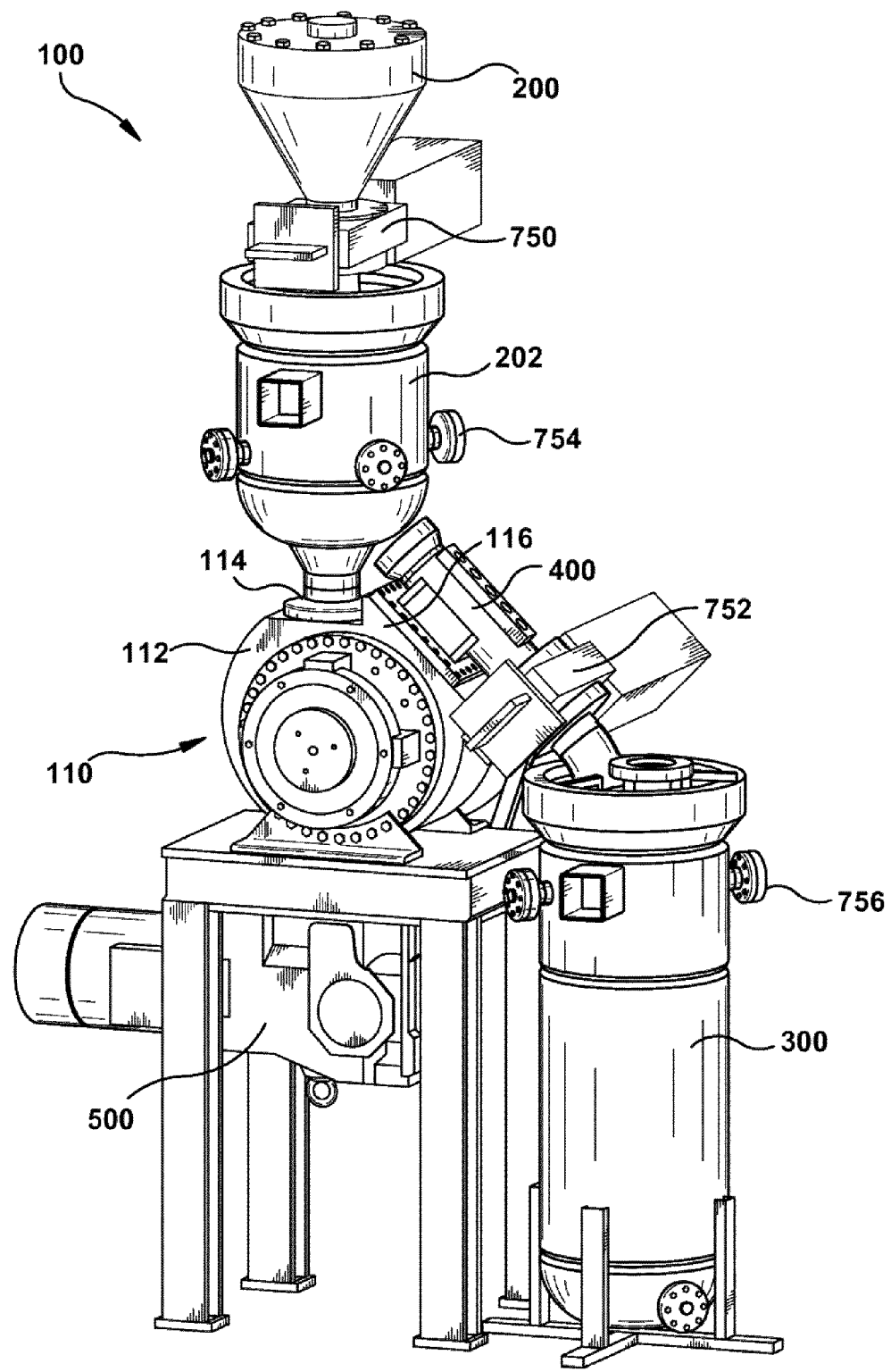
FIG. 1(a) is a perspective view of a system for transporting particulate material into a pressurized environment, according to an embodiment of the invention.
Figure 1B:
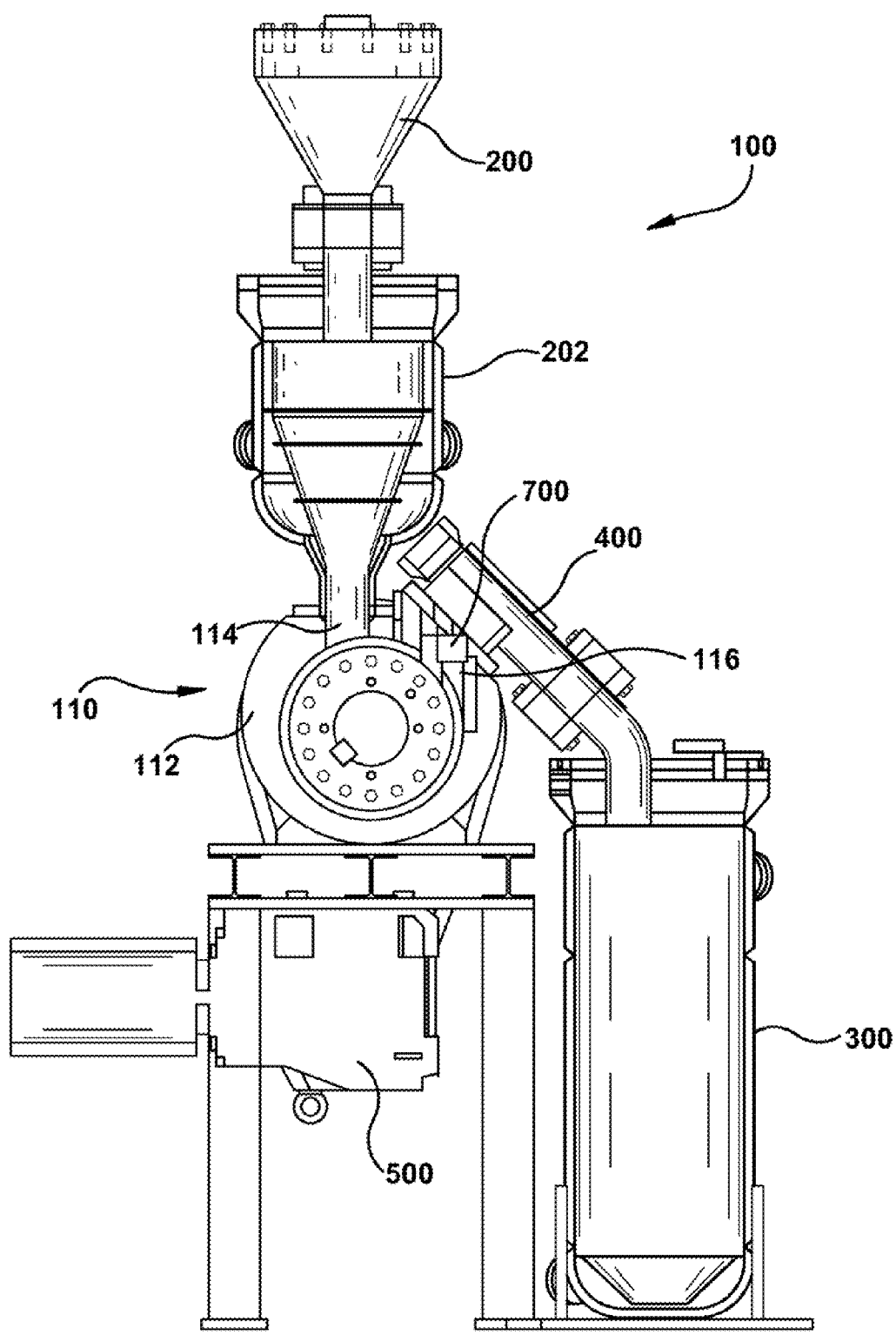
FIG. 1(b) is a partial cut-away view of the system of FIG. 1.
Figure 2:
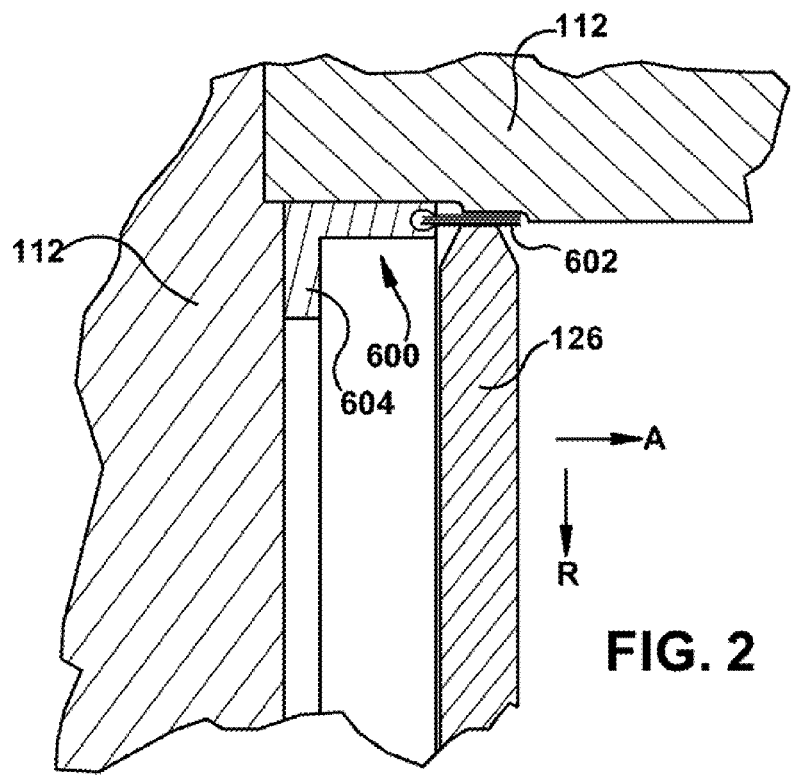
FIG. 2 is a cross-sectional view of a portion of a transporting apparatus having a seal arrangement according to an embodiment of the invention.
Figure 3:
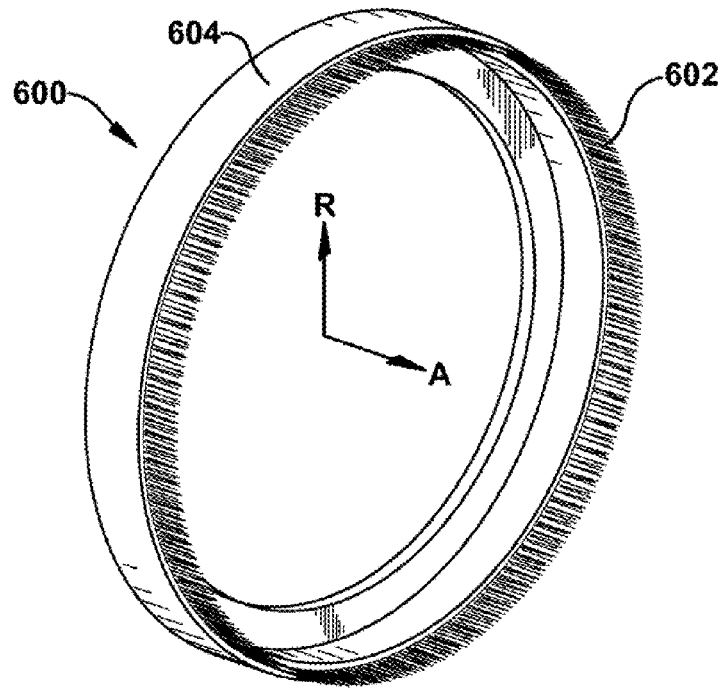
FIG. 3 is a cross-sectional view of a seal member in the seal arrangement of FIG. 2.
Figure 22:
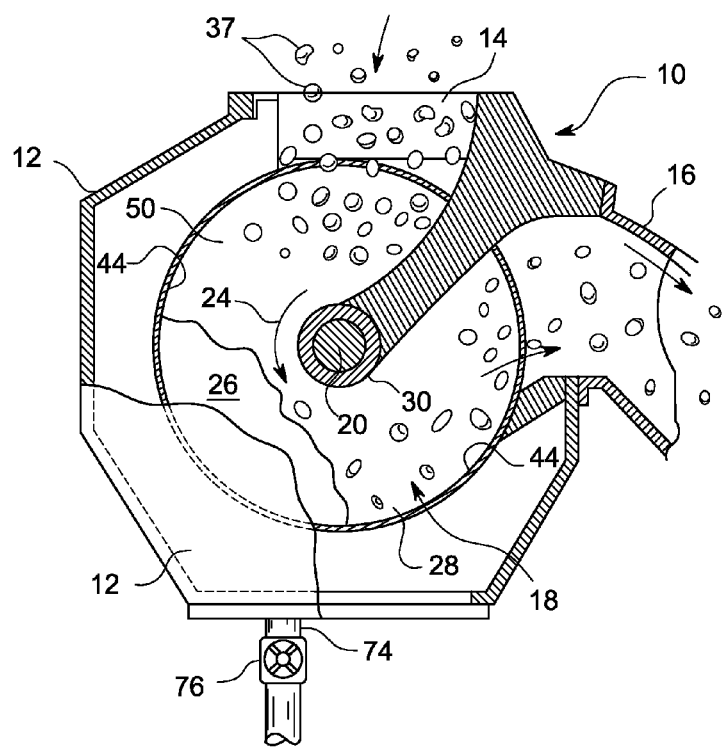
FIG. 22 is a partial sectional side view of a rotary disk type transporting apparatus.
Figure 23:
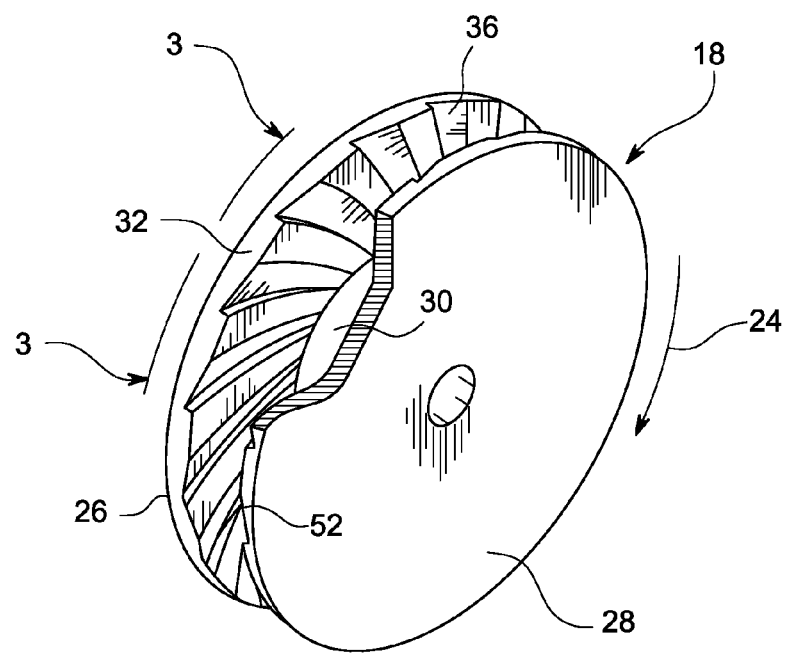
FIG. 23 is a perspective cut away view of a drive rotor of the apparatus of FIG. 22.
Figure 24:
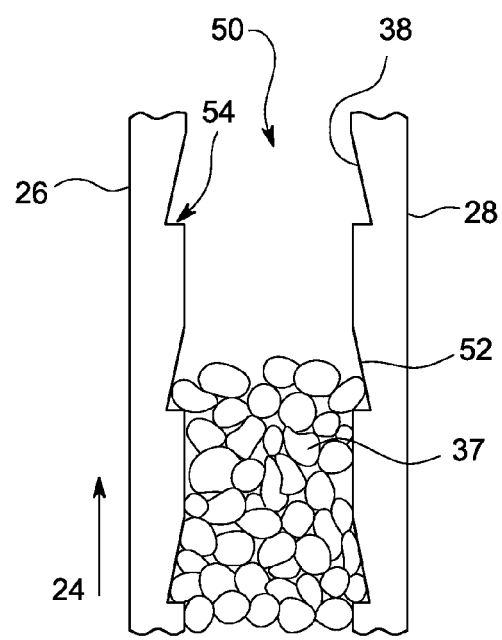
FIG. 24 is a partial cross-sectional view of a drive rotor of FIG. 23.

A prior art apparatus 10 for transporting particulate material similar to the embodiment of FIGS. 1-3 of the U.S. Pat. No. 5,402,876 and FIGS. 1-3 of U.S. Pat. No. 5,355,993 is illustrated in FIGS. 22-24 herein. Corresponding reference numbers are used herein, for convenience. FIG. 22 is a partial cross-sectional view of a disk type transporting apparatus 10, with one disk removed, to illustrate an internal view of the transport channel. The apparatus 10 in FIG. 22 includes a housing 12 having an inlet 14 and an outlet 16 and containing a drive rotor 18. The drive rotor 18 is mounted on shaft 20, and the shaft 20 is supported within the housing 12 for rotation about the shaft axis, for example, with one or more conventional low-friction bearings. The shaft 20 is operatively connected to be driven by a motor (not illustrated) in the direction illustrated by arrow 24.

As illustrated in FIGS. 23 and 24, the drive rotor 18 includes a plurality of disks. In the illustrated embodiment, the drive rotor 18 includes two disks 26 and 28 supported on a hub 30. However, in other embodiments, the drive rotor may include more than two disks (to define multiple transport channels), for example, but not limited to, configurations as described in U.S. Pat. No. 6,213,289. The disks 26 and 28 in FIGS. 23 and 24 are supported with opposing faces 36 and 38. The opposed disk faces 36 and 38 have a plurality of evenly spaced, generally radial discontinuities 52. The space between the opposed faces of the disks 26 and 28 and extending between the inlet 14 and the outlet 16 defines a transport channel (50 in FIG. 24). A stationary wall surface 44 of or in the housing 12 defines the outer circumference of the transport channel. During operation, the peripheral edges 32 and 33 of the disks 26 and 28, respectively, are arranged adjacent to the stationary wall surface 44 (or a wall surface adjacent the stationary wall surface. Examples of suitable discontinuities 52 in the disk faces 36 and 38 that may be employed in embodiments of the invention are described in U.S. Pat. No. 5,355,993.

Figure 25A:
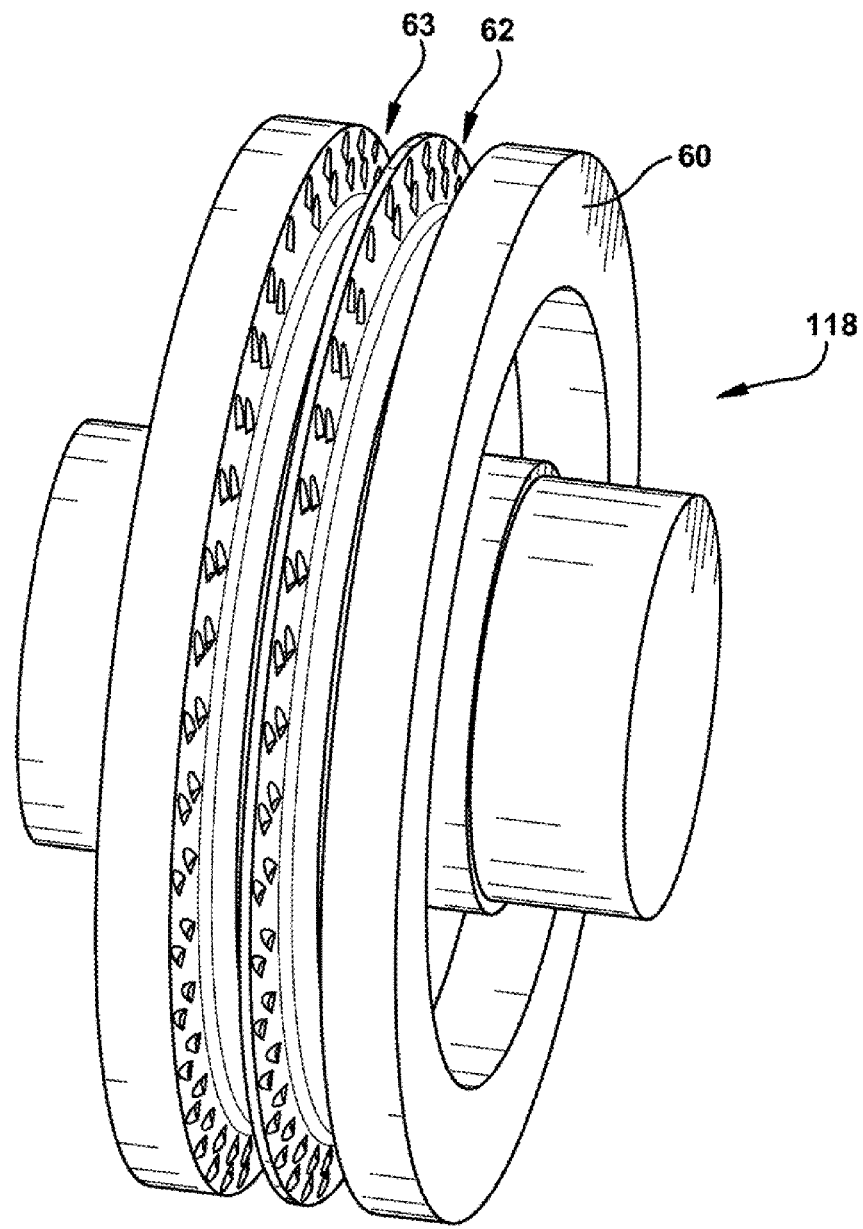
FIGS. 25(a) and 25(b) are a perspective and cross-section views, respectively, of a rotor structure for a transporting apparatus according to an embodiment of the invention.
Figure 25B:
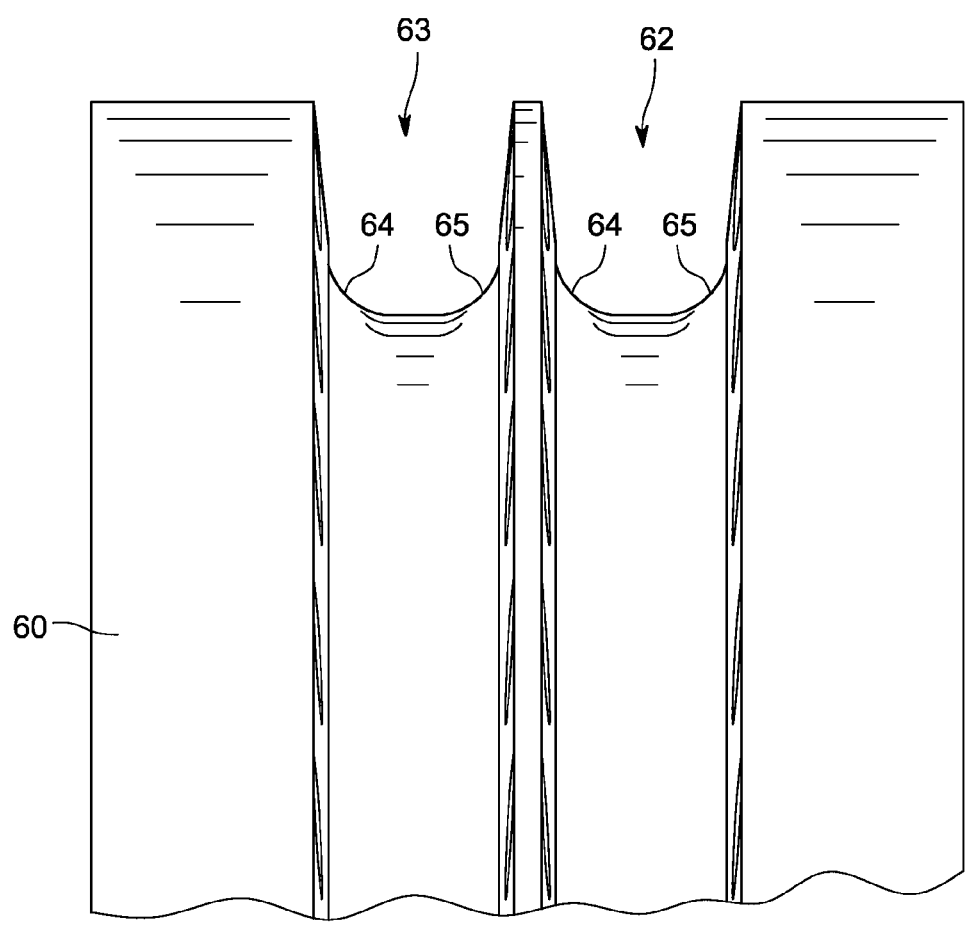

A rotor 18 may be formed of a multi-piece structure, for example, composed of two or more disks and a central hub, for example, but not limited to multi-piece rotor structures as described in U.S. Pat. No. 6,213,289. In further embodiments, for example, as illustrated in FIGS. 25(a) and 25(b), the rotor 118 may be configured as a one-piece structure, composed of a generally cylindrical body 60, in which at least one annular channel is formed around the annular peripheral surface of the generally cylindrical body. In the example of FIGS. 25(a) and 25(b), a rotor includes two parallel, annular channels 62 and 63. In one example embodiment, each annular channel may be machined into the generally cylindrical body, by a lathing or cutting tool. A one-piece rotor 118 may be made by any other suitable manufacturing process, for example, but not limited to, molding the one-piece structure in a mold. Each channel in the rotor 118 forms a transport channel 50 with the stationary wall surface 44, when the rotor 118 is supported within a transporting apparatus housing 12. While the embodiment illustrated in FIGS. 25(a) and 25(b) illustrates two channels in the rotor 118 that form two respective transport channels 50, other embodiments may be provided with one channel or more than two channels.

Each channel in the embodiment illustrated in FIGS. 25(a) and 25(b) includes rounded internal corners 64 and 65. Alternatively, the channel may be fully rounded (such as to form a portion of a circle in cross-section view in a plane along and through the axis of the rotor). The rounded corners or rounded channel can inhibit particles of transported material from collecting in corner regions.

In operation, particulate material 37 may be fed through the inlet 14 and into the transport channel(s) 50 between the opposed faces of the disks 26 and 28. As the drive shaft 20 is driven for rotation, the rotor disks 26 and 28 rotate and the particulate material in the transport channel is compacted by the frictional engagement of particles with the opposed faces of the rotating disks 26 and 28 and the with the stationary wall surface 44, 46.

As illustrated in FIG. 24, the compaction of particulate material 37 results in the formation of a transient solid or bridge composed of substantially abutting or interlocking particulate spanning the width of transport channel 50. The particulate material spanning the width of the transport channel 50 includes particulate material compacted within transport facilitation zones 54 defined by the discontinuities 52 in the opposed surfaces of the disks 26 and 28. Rotation of the disks 26 and 28 causes the bridged particulate material to be moved toward the outlet 16 and further compacted as the material is moved to form a moving dynamic mass of particulate material. By controlling the rotational drive of the drive shaft 20 and rotor 18, the disk speed may be controlled to provide a controlled transportation and/or metering of particulate material out of the outlet 16.

Dust or debris collected within the housing 12, for example, that may escape from the transport channel 50 during operation of the apparatus 10, may be removed through a conduit 74 and valve 76 arrangement. Additional details and features relating to the operation and structure of a rotary disk type apparatus for transporting and/or metering particulate material are described in the above-referenced patents.

According to one embodiment of the invention, a disk type apparatus for transporting and/or metering particulate material (such as, but not limited to an apparatus as described above or in any one of the above-referenced patents) may be employed in a system for transporting particulate material across a pressure differential. According to further embodiments of the invention, a disk type apparatus is provided with one or more structural configurations for improving capabilities for transporting particulate material across a pressure differential and, in particular embodiments, for transporting particulate material into a relatively high pressure environment. According to yet further embodiments of the invention, a disk type apparatus having one or more of such structural configurations is incorporated in a system for transporting particulate material across a pressure differential.

A system 100 for transporting particulate material across a pressure differential according to an example embodiment of the invention is illustrated in FIGS. 1(a) and 1(b). Other system embodiments may include some, but not all of the system components described herein in various combinations and/or may include further components.

The system 100 in FIGS. 1(a) and 1(b) includes a rotary disk type apparatus 110 for transporting and/or metering particulate material (such as, but not limited to a rotary disk type apparatus 10 as described above or in any one of the above-referenced patents and/or as described herein). The disk type apparatus for transporting (hereinafter "transporting apparatus 110) includes a rotor 118 supported in a housing 112. The housing 112 has an inlet 114 that is operatively connected to a hopper structure, to receive particulate material from the hopper structure. The inlet 114 may include suitable connectors to allow ready connection and disconnection to an outlet end of the hopper structure. In embodiments involving transporting under pressure or across a pressure differential, the connection between the inlet 114 and the outlet end of the hopper structure may comprise a suitable seal for inhibiting pressure leakage.

The transporting apparatus 110 includes an outlet 116 that is operatively connected to a destination vessel, a further transporting apparatus, a transporting pipeline (such as, but not limited to a pneumatic pipeline having a fluid pressure for driving material through the pipeline to a remote vessel or other remote location). In one embodiment illustrated in FIGS. 1(a) and 1(b), the outlet may be coupled to a pressurized vessel 300, through an outlet conduit 400. In one example embodiment, the vessel 300 may comprise a housing for a gasification vessel (such as a coal gasification vessel) or a pressurized furnace that receives coal or other suitable fuel from the transporting apparatus 110, through the outlet conduit 400. In other embodiments, the vessel 300 may comprise a cooking vessel or manufacturing vessel for containing material received from the transporting apparatus 110 for use in a cooking or manufacturing processes. While the embodiment illustrated in FIGS. 1(a) and 1(b) includes an outlet conduit 400 coupling the outlet of the transporting apparatus 110 to the destination vessel 300, other embodiments may employ a direct coupling of the outlet of the transporting apparatus 110 to the vessel 300 (or further transporting apparatus or pipeline) without an outlet conduit 400, or with a small outlet conduit 400.

The transporting apparatus 110 may be coupled to a dust collection system 500 by a connection (for example, but not limited to, through a conduit and valve structure as illustrated at 74 and 76), for collecting dust or debris that may escape from the transport channel during operation of the transporting apparatus 110. Further details relating to certain aspects of the above-described components of the system 100 are described below.

Hopper Structures:

The hopper structure in the embodiment of FIGS. 1(a) and 1(b) is a multi-stage hopper, having an inlet hopper 200 and a second hopper 202. The inlet hopper 100 may comprise any suitable hopper structure having an interior volume capable of holding particulate material and having an outlet through which particulate material from the interior volume may flow, for example, by gravity. The outlet of the inlet hopper 200 is operatively connected to the inlet of a second hopper 202, to allow particulate material from the inlet hopper to flow into the second hopper.

In one example embodiment, one of or both of the inlet hopper 200 and the second hopper 202 may have a moveable wall configuration, such as, but not limited to the configurations described in U.S. Pat. No. 5,533,650, issued Jul. 9, 1996 and titled Hopper With Moving Wall And Method Of Making And Using The Same. Moveable wall hoppers, as described in the above-referenced patent, employ one or move moveable walls and one or more vibrators for causing the moveable wall(s) to make a vibratory or other defined motion. A moveable wall hopper may help to feed particulate materials into a relatively small inlet opening, by helping to reduce blockages within the hopper outlet and, thus, allowing the hopper outlet to be made relatively small to match a small inlet opening. For example, in embodiments in which the transport apparatus 110 is configured to transport particulate material into a pressurized environment, the transport channel in the transport apparatus 110 may be formed relatively narrow (to reduce leakage of back pressure and to enhance particle compaction forces), resulting in a relatively small inlet opening in the inlet 114. Accordingly, the use of a moveable wall hopper configuration can allow the inlet 114 of the transport apparatus 110 to be formed relatively small, without compromising the flow of particulate material from the hopper structure into the inlet 114.

In addition, one or both of the hoppers 200 and 202 may be provided with void or density sensors, for sensing voids or low density volumes (open volumes or volumes of insufficiently compressed particulate material) within the hopper interior. Vibrators for causing the motion of one or more moveable walls of the hopper may be controlled to activate and cause wall vibrations, upon the detection of a void (or a void having a volume exceeding a pre-defined threshold) within the hopper. Alternatively, or in addition, the vibrators may be controlled to activate and cause wall vibrations in a predefined timed sequence and/or timed cycles. Alternatively, or in addition, the vibrators may be controlled to activate and cause wall vibrations in a timing or in cycles timed to correspond to the rotation speed of the disks of the transporting apparatus 110, for example, such that the number of cycles per unit of time is increased as the disk speed increases and is decreased as the disk speed decreases. Alternatively, or in addition, the frequency and/or intensity of the vibrations may be varied to correspond to the disk rotation speed, for example, to increase in frequency and/or intensity as the disk rotation speed increases and to decrease with frequency and/or intensity as the disk rotation speed decreases. In such embodiments, suitable control electronics may be coupled to the vibrators and may be responsive to a detection of a disk rotation speed to control the on/off timing, frequency and/or intensity of vibrations produced by the vibrators. Disk rotation speed may be detected in any suitable manner, including, but not limited to optical, magnetic, or contact sensors, detection of drive motor power or amperage draw, or the like.

The second hopper 202 may be sealed or otherwise contained within a pressure-tight housing or vessel, for example, to provide a buffer area to absorb a back flow of fluid (such as pressurized gas) from a pressurized destination environment (such as, but not limited to vessel 300). In particular, the system may be configured and operated such that, during the transportation of particulate material into a higher pressure environment, compaction and compression of the particulate material within the transport channel and outlet duct of the transporting apparatus provides a moving dynamic mass that acts as a barrier against a back flow of fluid from the higher pressure environment, through the transport channel of the transporting apparatus 110. However, as the moving dynamic mass is formed and transported through the transporting channel and outlet duct, particles and groups of particles within the mass tend to move and shift positions relative to other particles in the mass. As a result, gaps and fissures may be temporarily formed, allowing for the back flow of fluid into the transport channel. If the back flow of fluid extends through the transport channel and through the inlet, the second hopper 202 may provide a pressure containment vessel that receives back flow fluid from the inlet of the transporting apparatus and dissipates the back pressure. Particulate material that may be blown back or otherwise disrupted by the back flow of fluid from the transport channel may be contained within the second hopper 202 and allowed to settle, once the moving dynamic mass re-forms a seal against back flow pressure. Thus, the second hopper 202 may provide a buffer area for containing and dissipating back pressure from the inlet of the transporting apparatus.

In certain embodiments, the second hopper 202 is a pressurized hopper that has an interior volume capable of containing particulate material under pressure, for example, in a gas or liquid pressure. For example, the second hopper 202 may comprise a moveable wall hopper structure as described above, contained within a vessel capable of containing a fluidic pressure. In such embodiments, a pressure valve structure 204 may be provided between the inlet hopper 200 and the second hopper 202 (for example, as a separate structure between the two hoppers or as a structure built into the outlet of the inlet hopper 200 or built into the inlet of the second hopper 202) and suitable seals may be provided, to reduce pressure leakage from the second hopper 202. The valve structure 204 or another valve structure on the second hopper 202 may provide a safety function, to release back pressure from (or equalize pressure in) the second hopper 202, in the event that the pressure in the second hopper 202 exceeds (or falls below) a predefined threshold. In some embodiments, a pressurized gas or liquid may be introduced into particulate material within the interior volume of the second hopper 202, for example, through suitable conduits and valve structures (not illustrated) that may be coupled in fluid flow communication with the interior volume of the second hopper 202.

The outlet of the second hopper 202 is operatively coupled to the inlet 114 of the transporting apparatus 110, to allow particulate material to flow from the interior of the second hopper into the inlet 114 of the apparatus 110. As described above, suitable connectors may be provided to allow ready connection and disconnection of the outlet of the second hopper 202 to the inlet 114 of the apparatus 110. Also as described above, in embodiments involving transporting under pressure or across a pressure differential, the connection between the inlet 114 and the outlet of the second hopper 202 may comprise a suitable seal for inhibiting pressure leakage.

In certain embodiments, it may be beneficial to reduce the distance between the outlet of the second hopper 202 and the disk surfaces of the drive disks within the apparatus 110. In such embodiments, the outlet of the second hopper 202 may be coupled directly to the inlet 114 of the apparatus 110 and the inlet 114 may be configured to provide a short distance for the particulate material to flow to enter the transport channel where the disks can impart forces on the material. For example, in embodiments in which the apparatus 110 is configured to transport particulate material into a pressurized environment, it may be beneficial to impart drive forces from the disks on the particulate material immediately (or within a reduced distance) after the material leaves the second hopper, to cause the material to bridge and form a moving dynamic mass that begins within the transport channel, relatively close to the inlet side of the transport channel. In further embodiments, a valve structure may be provided between the second hopper 202 and the apparatus 110 (for example, as a separate structure or as a structure built into the outlet of the second hopper 202 or built into the inlet 114 of the apparatus 110), to control the flow of particulate material from the second hopper 202 to the apparatus 110 and/or to control or inhibit the release of back pressure from the apparatus 110 into the second hopper 202.

While the multi-stage hopper structure described above includes a single inlet hopper 200 and a single second hopper 202, other embodiments may employ additional hoppers (for example, additional inlet hoppers 200 and/or pressurized hoppers 202 and/or other suitable hopper structures) within the multi-stage structure. In yet other system embodiments, a single inlet hopper 200 or a single pressurized hopper 202 may be operatively coupled to the inlet 114 of the apparatus 110, instead of a multi-stage hopper structure.

A multi-stage hopper structure as described above may be employed for controlling the flow of particulate material into the apparatus 110 in a controlled rate and, in some embodiments, at a controlled pressure (for example, at an increased pressure or a decreased pressure, relative to the environmental pressure). Alternatively or in addition, a multi-stage hopper structure as described above may be employed to help control or inhibit back flow of material, gas or liquid, for example, but not limited to, contexts in which the apparatus 110 is employed to transport material into a pressurized environment. A multi-stage hopper structure as described above may allow controlled filling cycles (for filling the respective hoppers with particulate material) to allow the material to sufficiently de-aerate, before entering the inlet 114 of the transporting apparatus 110. In addition, a multi-stage hopper structure as described above can control or absorb pressure pulses (such as pulses of back pressure that may travel through the system, into the hopper structure from the apparatus 110) that can blow particulate material back through or out of the system and/or that can fluff up particulate material and cause blockages or reductions in feed rates.

Disk Sealing:

As described above, the transporting apparatus 110 may comprise a rotary disk type transporting apparatus. Also as described above, a rotary disk type transporting apparatus according to embodiments of the invention includes two (or more) rotary disks arranged for rotation and that define a transport channel between the (each) pair of adjacent disks. The example described above with respect to FIGS. 23-25 includes rotary disks 26 and 28, housing 12 and transport channel 50.

During operation of a rotary disk type transporting apparatus, small or fine particles of particulate material can escape the transport channel by passing between the peripheral edge of a disk and the interior wall of the housing 12 adjacent the disk edge. This effect can be greater in context in which the transport channel is under a fluid pressure. An accumulation of such particles on components of the transporting apparatus outside of the transport channel can have adverse effects on the operation and operational life of the transporting apparatus.

As described in U.S. Pat. No. 6,213,289, a suitable seal may be provided around the periphery of the end disks to reduce the passage of dust and debris from the interior of the housing, while allowing the disk to rotate relative to the housing wall.

A seal configuration according to certain embodiments of the invention comprises a brush seal that includes a brush element having a plurality of closely-spaced bristles. Examples of brush seal configurations according to embodiments of the invention are described with reference to the drawings of FIGS. 2, 3, 4 and 5.

Figure 4:
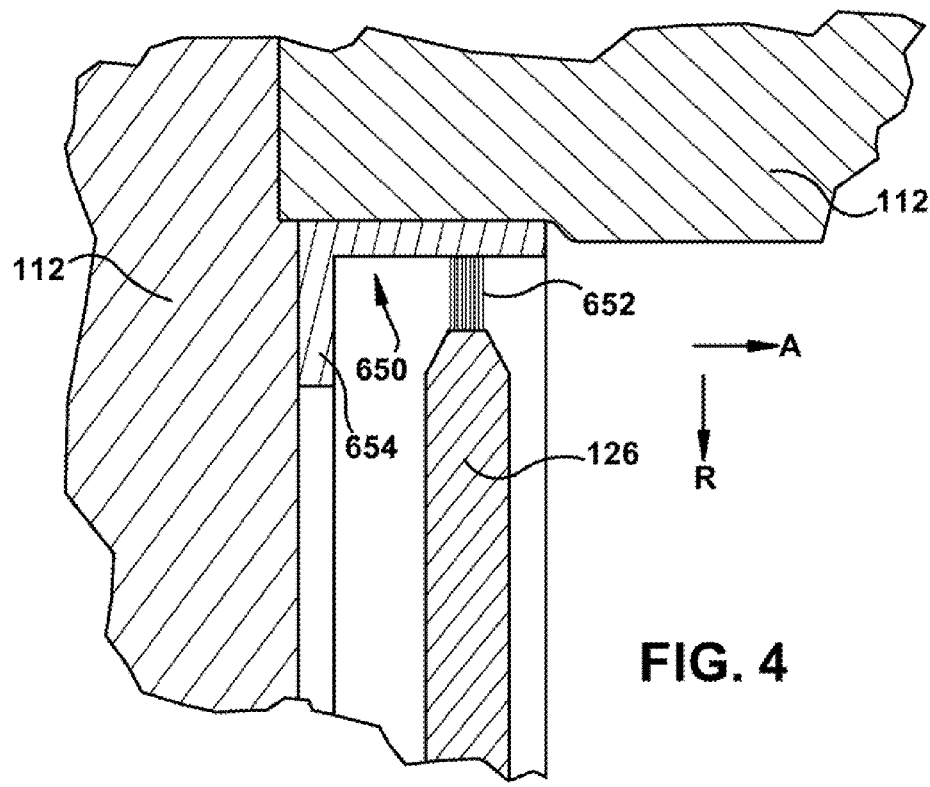
FIG. 4 is a cross-sectional view of a portion of a transporting apparatus having a seal arrangement according to another embodiment of the invention.

In the drawings of FIGS. 2 and 4, a disk 126 and a transport channel 150 are illustrated within the housing 112 (which may correspond to the disk 26, transport channel 50 and housing 12 described above with respect to FIGS. 15-17 or to other disk, channel and housing structures of other suitable apparatuses). The disk 126 is one of two or more disks (such as described above) supported for rotation about an axis A (for example, the axis of the shaft 20 in FIG. 23). FIGS. 2 and 4 illustrate partial views of the housing 112 and disk 126 with respective brush seal arrangements, where other disks are not in view. Embodiments of the invention may employ a seal arrangement as described with respect to FIGS. 2 and 4 on any one or combination of disks within the housing 112, such as, but not limited to one or both of the outermost disks on the rotor.

Figure 5:
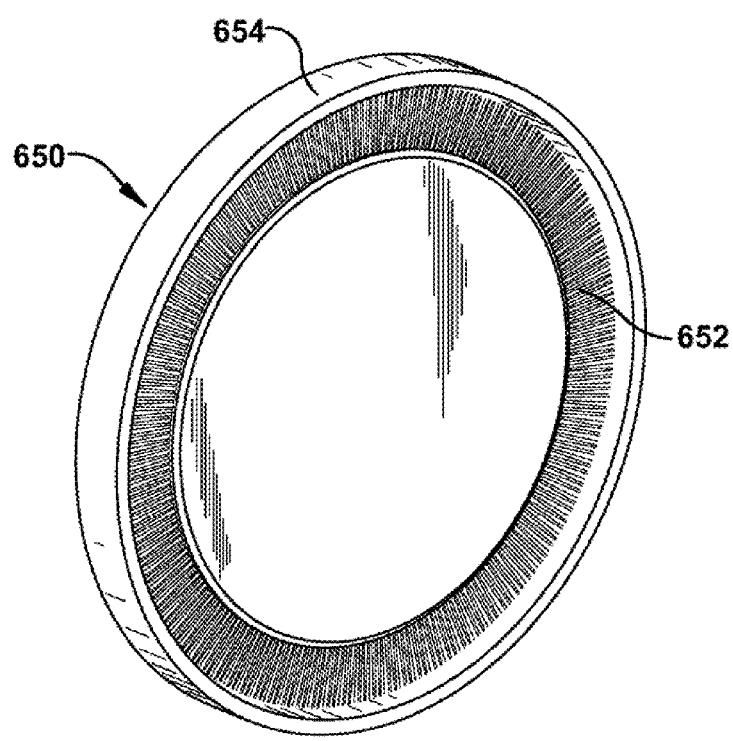
FIG. 5 is a cross-sectional view of a seal member in the seal arrangement of FIG. 4.

FIGS. 2 and 3 relate to an embodiment in which a brush seal 600 has a brush element 602 that is arranged generally in the axial direction A, while FIGS. 4 and 5 relate to an embodiment in which a brush seal 650 has a brush element 652 that is arranged generally in a radial direction R. More specifically, in the embodiment illustrated in FIGS. 2 and 3, a brush seal 600 includes a brush element 602 that is supported on an annular bracket 604. When mounted in the housing 112, the bracket 604 supports the brush element 602 such that the longitudinal, axial dimension of the bristles of the brush element 602 is arranged generally in the axial direction A of the rotation axis of the disks (the axis of the shaft 20). At least a portion of the axial length of the bristles are arranged to extend between and in contact with the peripheral edge of the disk 126 and a housing 112 wall, as the disk 126 rotates.

In the embodiment of FIGS. 4 and 5, a brush seal 650 includes a brush element 652 that is supported on an annular bracket 654. The bracket 654 may be similar to the annular bracket 604 of FIGS. 2 and 3. When mounted in the housing 112, the bracket 654 supports the brush element 652 such that the longitudinal, axial dimension of the bristles of the brush element 652 arranged generally in the radial direction R of the disk 126 (the axis of the shaft 20 in FIG. 15). In further embodiments, the axial dimension of the bristles of the brush element 652 may be arranged in other angles that are transverse to the axial direction A of the disk 126. At least a portion of the bristles is located between the peripheral edge of the disk 126 and a housing 112 wall. The bristles of the brush element 652 have one end connected to the bracket 654 and a free end extending toward the disk 126. The free ends of at least some of the bristles of the brush element 652 are arranged to contact the peripheral edge of the disk 126, as the disk 126 rotates.

As illustrated in FIGS. 2 and 4, the annular bracket 604 or 654 is mounted to an interior surface of a wall of or in the housing 112 (for example, but not limited to, a stationary wall such as described above with respect to wall 44 in FIG. 15 or a wall adjacent thereto or a surface of one or more structures disposed within the housing 112). The annular bracket 604 or 654 supports the seal element 602 or 652 in a position between the outer peripheral edge of the disk 126 and a wall (for example, but not limited to the stationary wall 44 described above in FIG. 15 or a wall adjacent thereto) of the housing 112.

The brush element 602 or 652 may comprise an annular arrangement of a plurality of closely-spaced bristles made of a suitable materials, such as, but not limited to steel or other suitable metal, carbon or other suitable non-metal materials capable of withstanding operational forces over a suitable operational life. The bristles may be sufficiently closely packed to provide a suitable seal against the passage of particulate material and fine particles from the transport channel, yet allow the passage of air (or other gas) between the peripheral edge of the disk 126 and the adjacent wall of or in the housing 112. In this manner, brush seals, as embodied by the invention, may be employed to provide a suitable particle seal, yet allow venting of gas from the transport channel.

In the illustrated embodiment, the brush element 602 or 652 is arranged to contact the peripheral edge of the associated disk 126. However, in other embodiments, the brush element 602 of 652 may be arranged to contact a disk face (an axially directed face of the disk, either the face of the disk directed toward the interior of the transport channel or the opposite face of the disk). Also, while the brush element 652 is illustrated as arranged generally radial to the disk 126 (perpendicular to the axis of rotation of the disk), other embodiments may include a brush element that is angled (greater than 0 degrees and less than 90 degrees) relative to the perpendicular of the axis of rotation of the disk.

In the embodiments illustrated in FIGS. 2, 3, 4 and 5, the annular bracket 604 or 654 has an "L" shaped cross-section (in the radial direction of the annular bracket or orthogonally oriented). As illustrated in FIGS. 2 and 4, the annular bracket 604 or 654 may be supported within the housing 112 and secured to an interior surface of a wall of or in the housing 112, such that one arm of the "L" shaped cross-section extends generally in the axial direction A, while a second arm of the "L" shaped cross-section extends generally in the radial direction. The brush element 602 or 652 is attached to the axially extending arm portion of the "L" shaped cross-section. The "L" shaped cross-section shape of the bracket 604 or 654 can provide two surfaces for securing to or supporting on two wall surfaces of or in the housing 112. However, in other embodiments, the annular bracket 604 or 654 may have an annular ribbon shape composed of the axially directed arm (without the radially directed arm) of the "L" shaped cross-section shape illustrated in FIGS. 2 and 4. Other suitable bracket configurations may be employed for supporting an annular arrangement of brush bristles in a position between the peripheral edge of the disk 126 and a surface of a wall of or in the housing 112, as described above.

A seal configuration according to other embodiments of the invention comprises a ring seal having a ring member that secures to the rotary disk and extends beyond the peripheral edge of the disk to contact an interior surface of a wall of the housing. A ring seal configuration according to an embodiment of the invention is described with reference to FIGS. 6, 7(a) and 7(b).

Figure 6:
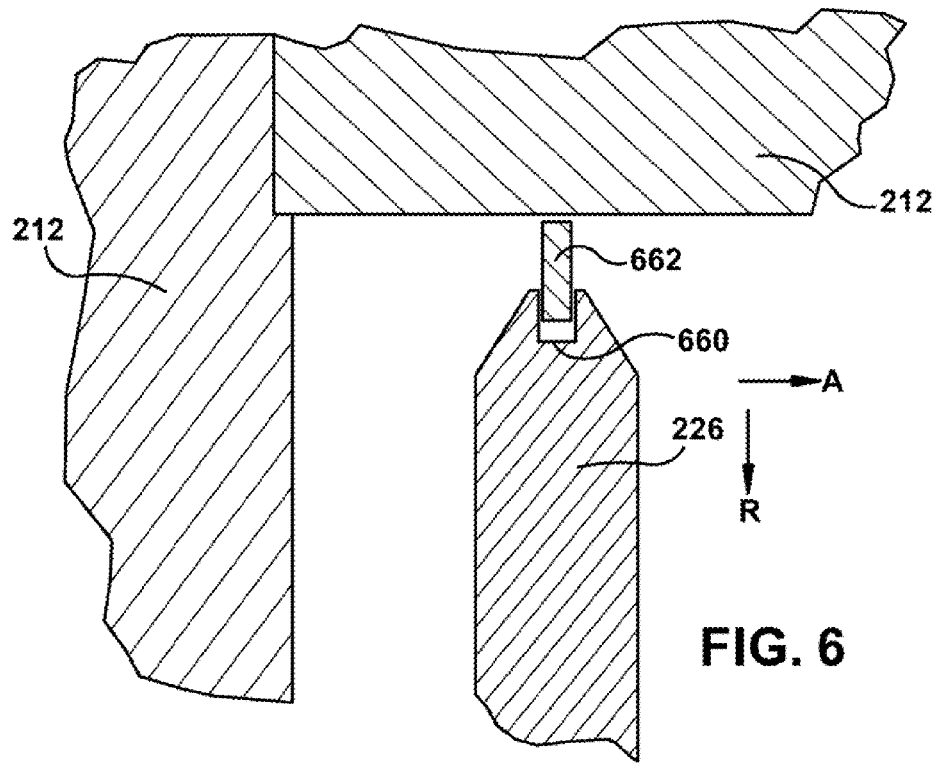
FIG. 6 is a cross-sectional view of a portion of a transporting apparatus having a seal arrangement according to another embodiment of the invention.
Figure 7A:
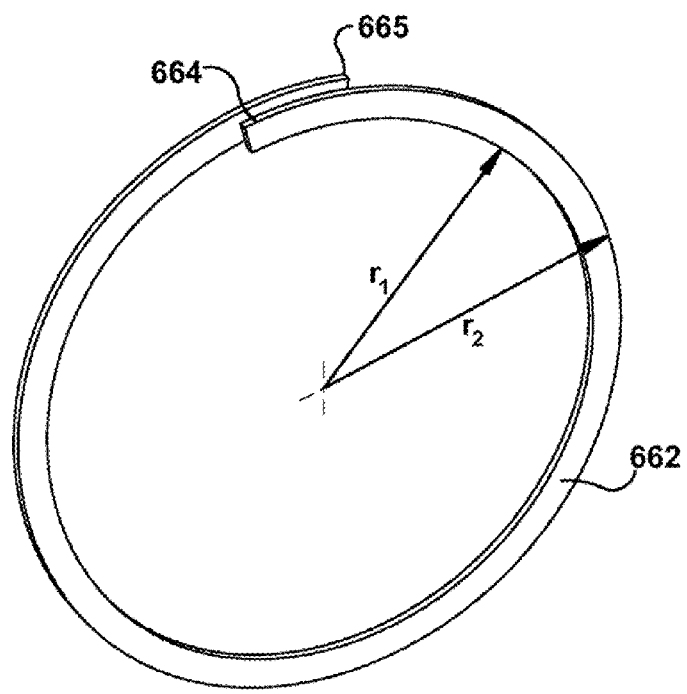
FIGS. 7(a) and 7(b) are each a perspective view of a seal member in the seal arrangement of FIG. 6, according to a respective embodiment of the invention.
Figure 7B:
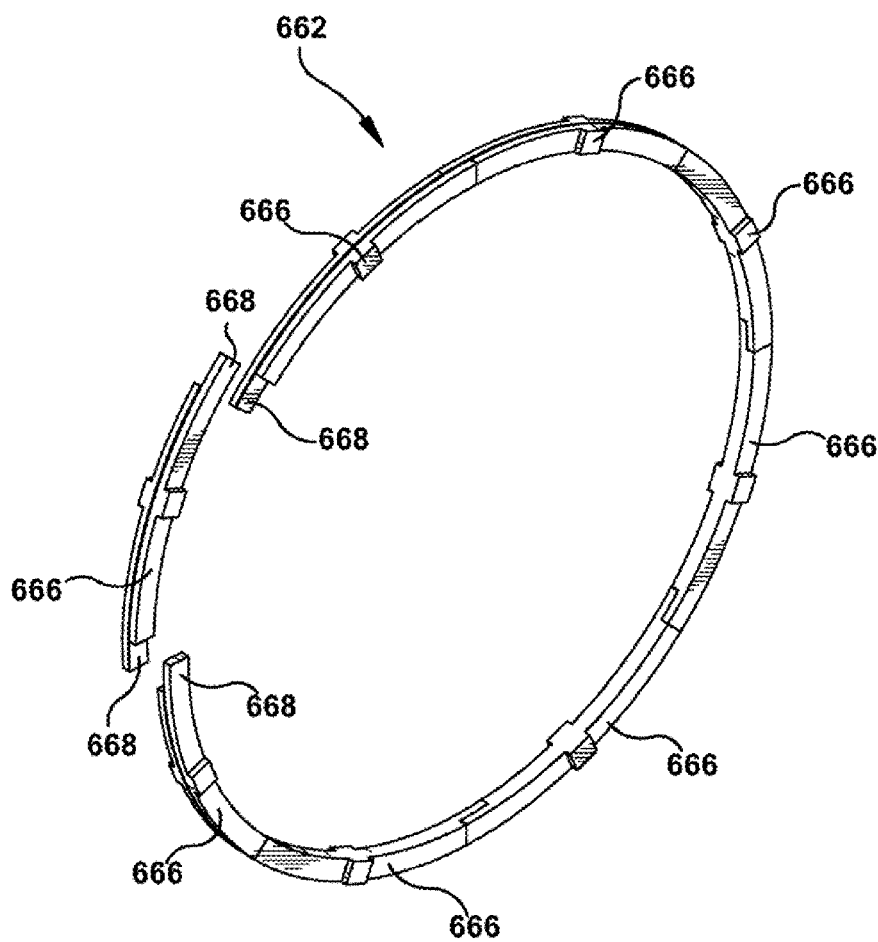

In the drawings of FIG. 6 a disk 226 is illustrated within the housing 212 (which may correspond to the disk 26 and housing 12 described above or to other disk and housing structures of other suitable rotary disk type transporting apparatuses). The disk 226 is formed in a configuration of at least one or two or more disks (such as described above) supported for rotation about an axis A (for example, the axis of the shaft 20). FIG. 6 illustrates partial views of the housing 212 and disk 226 with a seal arrangements, where other disks are not in view. Embodiments of the invention may employ a seal arrangement as described with respect to FIGS. 6, 7(*a*) and 7(*b*) on any one or combination of disks within the housing 212, such as, but not limited to one or both of the outermost disks on the rotor.

As illustrated in FIG. 6, each disk 226 that is provided with a seal includes a groove or channel 660 formed in the outer peripheral edge of the disk. An annular seal member 662 is disposed within the groove or channel 660 and extends at least partially out of the groove or channel 660 in the radial direction R of the disk 226. As illustrated with respect to the seal member example illustrated in FIG. 7(*a*), the inner radial dimension $r_1$ of the annular seal member 662 is selected to allow the seal member 662 to fit within the annular groove or channel 660 in the disk 226, while the outer radial dimension $r_2$ of the annular seal member 662 is selected to allow the seal member 662 to engage an interior surface of a wall (for example, but not limited to the stationary wall 44, 46 described above or a wall adjacent thereto) of the housing 212, as the disk 226 rotates during operation.

The annular seal member 662 may be composed of a single ring-shaped body of material having suitable strength, durability, rigidity and flexibility characteristics, such as, but not limited to, a steel or other metal, ceramic, composite material or the like. The term "annular" is used herein to include ring-like shapes that have free ends 664 and 665 that engage or overlap (as illustrated in FIG. 7(*a*)), and/or that can be separated to define a gap along the annular shape. Alternatively, the seal member 662 may comprise an annular ring-shaped body composed of a plurality of sections 666, as illustrated in FIG. 7(*b*). In the embodiment of FIG. 7(*b*), the annular ring-shaped body of the seal member 662, as embodied by the invention, is composed of eight arc-shaped sections 666 (where seven of the sections 666 are illustrated as connected and an eighth section 666 is illustrated as separated from the rest of the sections). However, in other embodiments, the annular ring-shaped body of a seal member 662 may be composed of a plurality or sections 666 that may total more or less than eight. The arc-shaped sections may be identical to each other, to simplify manufacturing and assembly. However, in other embodiments arc-shaped sections may have different shapes and/or different lengths in the circumferential dimension.

In the embodiment of FIG. 7(*b*), each arc-shaped section has an extension portion 668 at each end, for overlapping a corresponding extension portion 668 of an adjacent arc-shaped section, when the arc-shaped sections are arranged to form an annular ring-shaped body. The overlapping arrangement can provide a suitable seal at the interfaces between adjacent arc-shaped sections and can help inhibit excessive relative motion of the arc-shaped sections, while allowing some relative motion as the disks are rotated. In some embodiments, the adjacent arc-shaped sections may be connected together by suitable connection means, including, but not limited to, an adhesive material, welds, brazing, magnets, or the like, for example, on abutting surfaces of the overlapped extension portions 668. However, in other embodiments, no connection means is provided fix adjacent arc-shaped sections together.

In some embodiments, the annular seal member 662 may be made of a material that expands when heated, for example, during rotational operation of the disk 226. In some embodiments, the annular seal member 662 may be composed of a spring material that allows the seal member to having a natural spring force that allows the seal member to be compressed against its natural spring force to reduce its outer peripheral dimension and released to expand to increase its outer peripheral dimension.

For example, the annular seal member 662 may be made of a material having a suitable spring force and may be dimensioned such that the ends 664 and 665 may be pulled in a direction to increase the inner radial dimension $r_1$ sufficient to allow the seal member 662 to be placed in a groove or channel 660 on the disk 226. Once the seal member 662 is placed within the groove or channel 660, the ends 664 and 665 may be released to allow the radial dimension $r_1$ to compress sufficiently to retain the seal member 662 within the groove or channel 660. The dimensions and spring strength of the annular seal member 662 may be selected to allow the seal member to be compressed against its natural spring force, when the outer peripheral edge of the seal member 662 is in contact with the interior wall surface of or in the housing 212, as illustrated in FIG. 6. In this manner, the natural spring force of the seal member 662 may be used to force the outer peripheral edge of the seal member 662 against the interior wall surface of or in the housing 212, to provide a sealing action as the disk 226 rotates during operation.

In further embodiments, the seal member 662 may include one or more protrusions (such as tabs or keys) that engage one or more corresponding indentations or apertures in the disk 226 to inhibit rotation of the seal member 662 with respect to the disk 226 around the axis of the disk 226. Alternatively, or in addition, the disk 226 may include one or more protrusions (tabs or keys) that engage one or more corresponding indentations or apertures in the seal member 662, to inhibit rotation of the seal member 662 relative to the disk 226.

In the illustrated embodiment, the seal member 662 is arranged in a groove 660 around the peripheral edge of the associated disk 226. However, in other embodiments, the seal member 662 may be arranged in a groove provided on a disk face (the face of the disk directed away from the interior of the transport channel). Also, while the seal member 662 is illustrated as arranged in a groove that extends into the peripheral edge of the disk 226 in a generally radial direction relative to the disk (perpendicular to the axis of rotation of the disk), other embodiments may include a seal member 662 and/or groove arranged to be angled at angle $\alpha$ FIG. 6 ($\alpha$ greater than 0 degrees and less than 90 degrees) relative to the perpendicular of the axis of rotation of the disk. Also, while the illustrated embodiment, as embodied by the invention, includes one annular groove and one corresponding seal member 662 around the peripheral edge of the disk, other embodiments may employ multiple seal members and/or multiple grooves, for example, arranged parallel to each other.

Figure 8A:
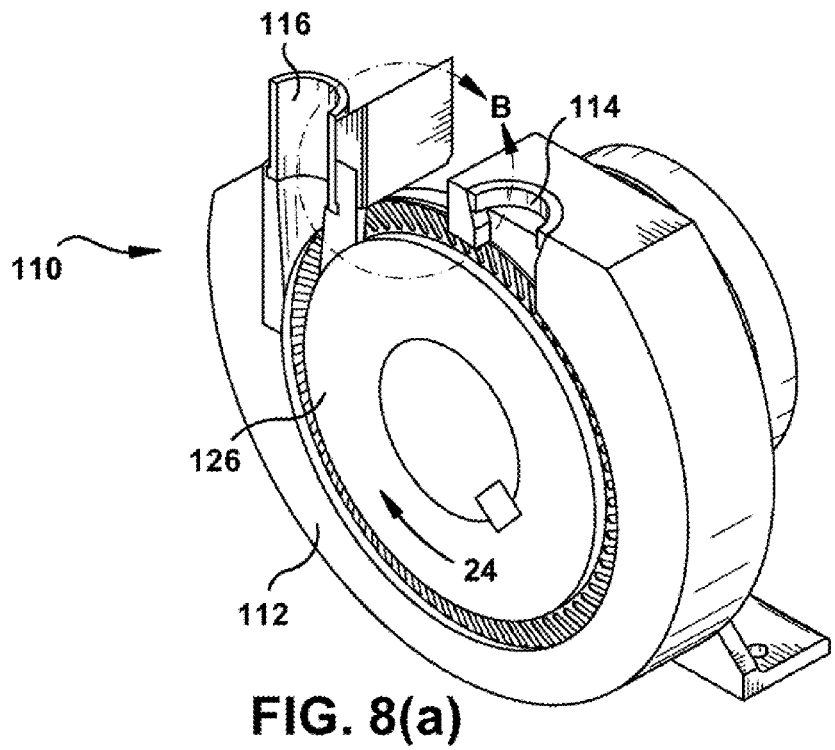
FIGS. 8(a) and 8(b) are a perspective and detailed view, respectively, of a transporting apparatus with a seal cleaning member.
Figure 8B:
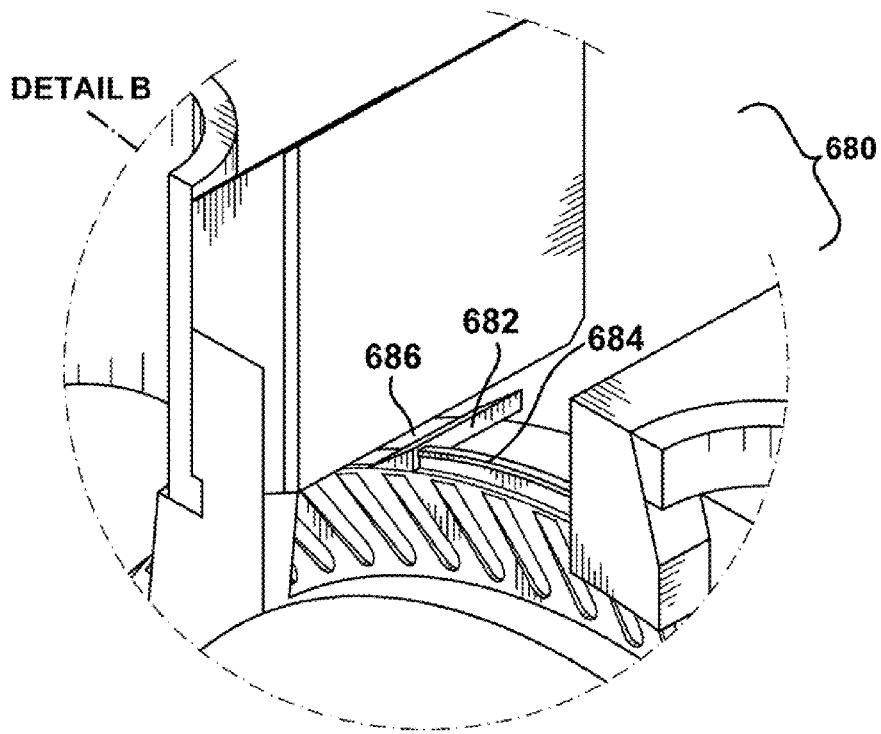

In embodiments employing a seal member 662 as described above, a wiping or cleaning member or surface may be provided in the transporting apparatus 110, for engaging the seal member 662 to wipe the seal member and remove particulate material that may be adhered to the seal member, as the disk 226 is rotated. In one embodiment, the wiping or cleaning member 680 may be located in the region upstream of the inlet and downstream of the outlet ends of the transport channel, with respect to the direction of motion 24 of the disks during operation, for example, as illustrated in FIGS. 8(*a*) and 8(*b*). FIG. 8*a* illustrates a partial cut-away, perspective view of a transporting apparatus 110 of the type described above with respect to FIGS. 1(*a*) and 1(*b*), where the location of a cleaning member is illustrated with the circle labeled "B", between the inlet 114 and the outlet 116 (FIG. 8(*a*)). FIG. 8(*b*) is a detail view of the portion of FIG. 8(*a*) within the circle labeled "B," where the cleaning member 680 is located. The cleaning member 680 is arranged to either contact the peripheral edge of the seal member 662 or be located slightly spaced apart in the radial dimension from the peripheral edge of the seal member 662, as the disks are rotated during operation. The cleaning member 680 may comprise any one or more of suitable wiping or cleaning structures, including, but not limited to, a wiping blade, a scraping tool, a brush, or the like. In the embodiment in FIG. 8(*b*), the cleaning member 680 comprises a wedge-shaped blade 682, a brush member 684 and a dynamic seal 686. The blade 682 is arranged with the apex of the wedge adjacent the peripheral edge of the seal member 662. The cleaning member 680 may be made of any suitable materials capable of withstanding operational forces and perform the functions described herein, including, but not limited to, steel or other metal, plastic, composite material or the like.

Outlet Duct:

Rotary disk type transporting apparatuses as described above may be configured for transporting particulate material into a pressurized environment. The configuration of the outlet of the transporting apparatus can have an significant effect on the capability of the apparatus to transport material into a pressurized environment.

Some examples of diverging outlet ducts for improving the capability of transporting against a fluid pressure are described in U.S. Pat. No. 5,402,876, issued Apr. 4, 1995 and titled Apparatus And Method For Transporting And Metering Particulate Material Into Fluid Pressure. The diverging duct can help to improve sealing effects of the moving dynamic mass of particulate material exiting the transporting apparatus, to help seal against back pressure from the outlet side (e.g., a pressurized environment) of the transporting apparatus.

However, in some contexts, a continually diverging outlet duct can be prone to conditions referred to as "rat holing" (where voids and channels are formed in the mass of particulate material passing through the outlet duct) or other discontinuities in the particulate mass that can result in a loss of a pressure seal. Outlet duct arrangements having a parallel wall (generally constant cross-section area) along the duct length can provide a more stable outlet seal, but can also result in higher loads against the drive force of the transporting apparatus.

An outlet duct configuration in the transporting apparatus 110 of FIG. 1(*b*) is illustrated at reference character 700. According to an embodiment of the invention, the outlet duct 700 may be configured to include a combination of one or more parallel and diverging sections. The cross-sectional area of the duct (along the direction perpendicular to the longitudinal dimension of the duct) is generally constant in each parallel section and increases (in the flow direction, away from the disks of the transporting apparatus) in each diverging section.

Figure 9A:
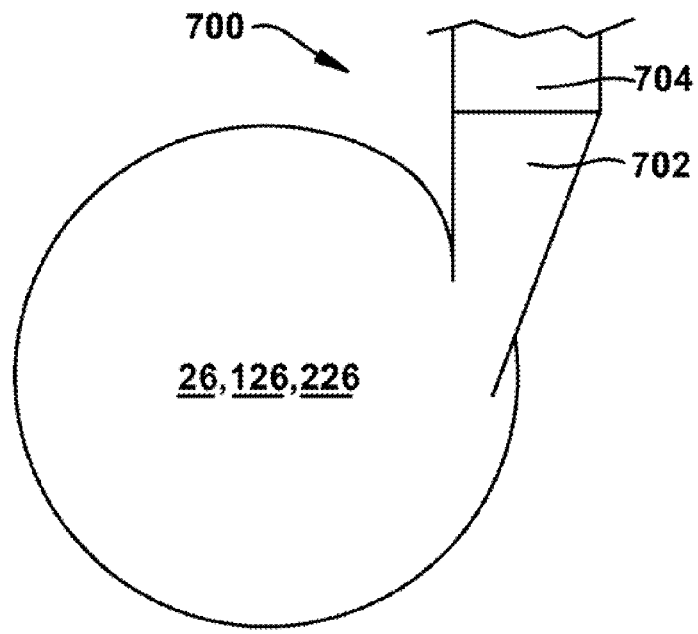
FIGS. 9(a) and 9(b) are each a cross-sectional view of a portion of a transporting apparatus having an outlet duct according to a respective embodiment of the invention.
Figure 9B:
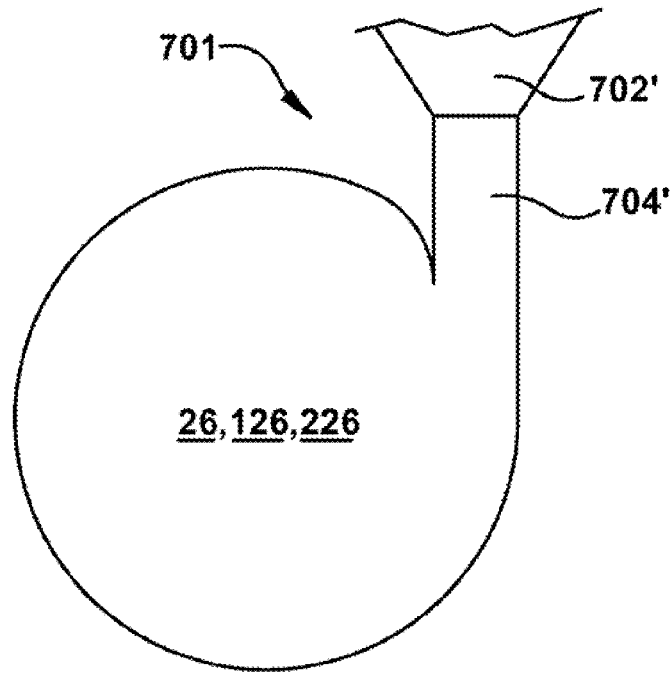

In the embodiment of FIG. 9(*a*), an outlet duct configuration 700 in cooperation with disk 26, 126, and/or 226, may include a diverging section 702, followed by a parallel section 704, in the flow direction of material transported by the transporting apparatus. Alternatively, an outlet duct configuration 701 according to another embodiment of the invention as illustrated in FIG. 9(*b*) may include a parallel section 704' followed by a diverging section 702', in the flow direction of material transported by the transporting apparatus. In further embodiments, more than two alternating parallel and diverging sections may be employed.

While the embodiments of FIGS. 9(*a*) and 9(*b*) illustrate generally gradual divergences of the cross-sectional area in the diverging section 702, other embodiments may employ one or more abrupt, for example, step-like, increases in cross-sectional area in the diverging section 702. The rate of divergence may be selected, based on the type of material being transported, the amount of pressure in the destination environment and other factors.

Figure 10A:
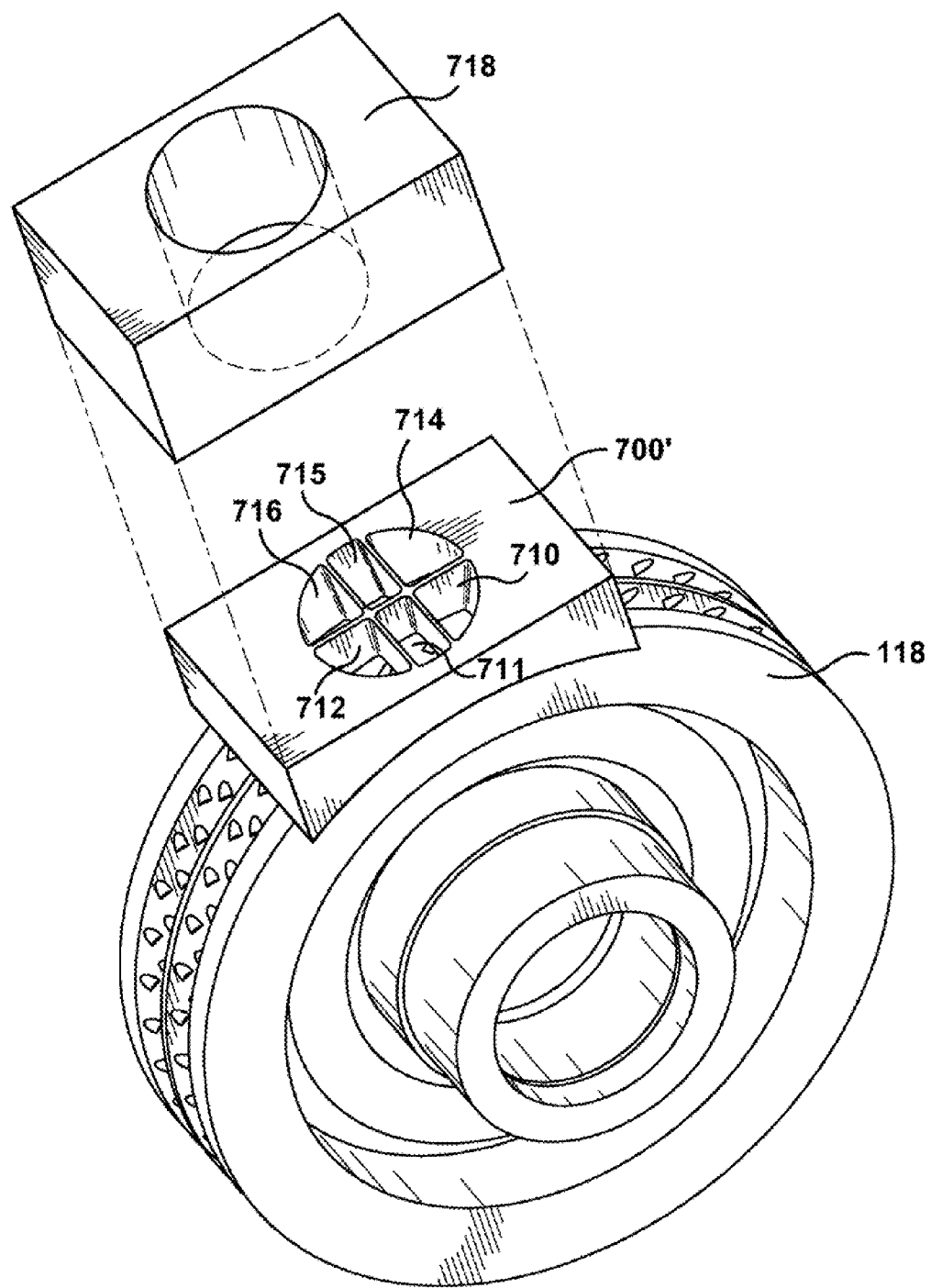
FIGS. 10(a) and 10(b) are a perspective view and a top-down view of a section of an outlet duct adjacent a rotor.
Figure 10B:
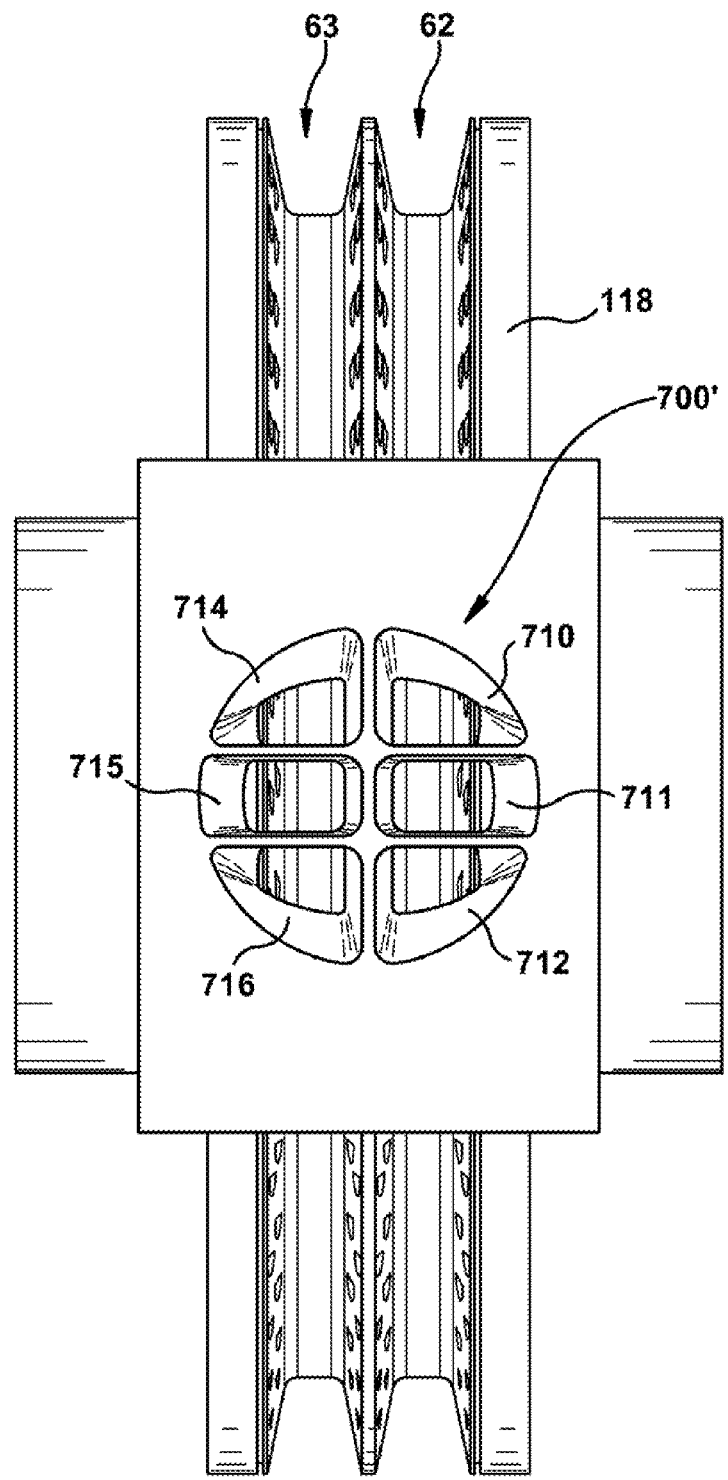

An outlet duct 700' according to a further embodiment of the invention is described with reference to FIGS. 10(*a*) and 10(*b*). In FIGS. 10(*a*) and 10(*b*), a multi-section outlet for a two-channel transporting apparatus is illustrated with a two-channel rotor 118 that corresponds to the rotor in FIGS. 25(*a*) and 25(*b*). The outlet duct 700' includes a set of outlet openings 710, 711 and 712 that align with one channel 62 of the two-channel rotor 118 (FIG. 10(*b*)). The outlet duct 700' also includes a second set of outlet openings 714, 715 and 716 that align with the other channel 63 of the two-channel rotor 118. In embodiments in which a single-channel rotor is employed, the outlet duct 700' need only have one set of outlet openings that align with the single channel. In other embodiments, a rotor 118 may include more than two channels, in which case the outlet duct 700' may have a number of sets of outlet openings that correspond to the number of channels.

In the embodiment of FIGS. 10(*a*) and 10(*b*), the outlet duct 700' has a different set of three outlet openings aligned with each respective channel. In other embodiments, the outlet duct 700' may include two or more than three outlet openings aligned with each respective channel. In yet further embodiments, an outlet opening that aligns with one of the channels may be arranged to overlap and align with part or all of another channel or channels, as well.

Each of the outlet openings 710, 711, 712, 714, 715 and 716 in the outlet duct 700' in FIGS. 10(*a*) and 10(*b*) has a diverging cross-section shape (that diverges in cross-sectional area, diverging in the direction of flow of material through the outlet duct, where the cross-section is taken generally perpendicular to the flow direction). However, in other embodiments, some, but not all of the outlet openings 710, 711, 712, 714, 715 and 716 may have a diverging cross-section, while one or more other outlet opening(s) 710, 711, 712, 714, 715 and 716 may have a non-diverging cross-section. In yet further embodiments, each one of some or all of the outlet openings 710, 711, 712, 714, 715 and 716 may have a combination of diverging and non-diverging cross-section shapes, as described above with respect to FIGS. 9(*a*) and 9(*b*).

In yet a further embodiment, each one of some or all of the outlet openings 710, 711, 712, 714, 715 and 716 has a diverging cross-sectional shape and a further section 718 of the outlet is positioned adjacent and in flow communication with the outlet openings 710, 711, 712, 714, 715 and 716 (for example, down-stream of the outlet openings 710, 711, 712, 714, 715 and 716 in the flow direction of material through the outlet) The further section 718 of the outlet duct may have a single, parallel (or non-diverging) cross-section shape in the flow direction (where the cross-section is taken perpendicular to the flow direction). In yet other embodiments, the further section 718 may have a single, diverging cross-section shape, as described above. In yet other embodiments, the further section 718 may have a combination of parallel and diverging cross-section shapes. The multiple outlet openings 710, 711, 712, 714, 715 and 716 may distribute particulate material into the further section 718 more evenly than a direct flow from the rotor channels 62, 63 into the duct section 718.

As the conditions of use of a particular transporting apparatus may change over the operational life of the apparatus, some transporting apparatus embodiments of the invention may employ replaceable outlet duct configurations, that allow the outlet duct to be removed and replaced with a different (new, refurbished, or differently dimensioned) outlet duct. According to certain embodiments of the invention, the outlet duct 700 may be provided with replaceable sections and/or inserts that allow adjustment of cross-sectional dimensions of the duct sections, so that the inclusion of parallel or diverging sections or the relative locations of parallel or diverging sections may be selected and changed. Different variations may be selected and configured for different materials and/or applications of use, while the general configuration of the transporting apparatus may otherwise remain the same. Replaceable sections may comprise a plurality of tube sections that have suitable connection structures for connection together in various arrangements, to form an outlet duct. Replaceable inserts may comprise tube sections that are inserted within the outlet duct to define the operational interior volume of the outlet duct.

The outlet duct of the system can receive significant loads during operation and can be subject to wear over time. Replaceable inserts may be employed within the outlet duct sections for improving operational life of the system, by allowing replacement of an insert when particulate-contacting surface of the insert becomes worn.

Outlet Abutment Configurations:

Rotary disk type transporting apparatuses as described above typically include an abutment member or surface arranged adjacent the outlet, to direct particulate material out of the transport channel and into the outlet duct. For example, an outlet abutment insert 800 may be arranged within the transporting apparatus 110, as illustrated in FIG. 1(b).

The outlet abutment insert 800 comes into contact with particulate material and functions to redirect the particulate material from its annular path of motion with the rotation of the disks, to the outlet duct. As a result the outlet abutment insert 800 can be subject to a significant loads and wear forces during operation of the transporting apparatus 110.

Outlet abutment insert 800, as embodied by the invention, is configured to be insertable and replaceable with respect to the housing 112 of the transporting apparatus 110. Accordingly, a worn outlet abutment insert 800 may be replaced with a new or refurbished abutment, to extend the operational life of the transporting apparatus 110. In particular, as embodied by the invention, the housing 112 of the transporting apparatus 110 may be configured with a receptacle for receiving an outlet abutment insert 800 in the form of an insert. In a further embodiment, the outlet abutment insert 800 may be formed integral with (or otherwise fixed together with) the outlet duct 700 as a single unit. In yet further embodiments, the outlet abutment insert 800 and outlet duct 700 may be formed as a single unit and also formed as an insert that may be selectively inserted and removed from a corresponding receptacle in the transporting apparatus 110.

An outlet abutment insert 800 for a single transport channel, as embodied by the invention, is illustrated in FIGS. 11-15. The outlet abutment insert 800 illustrated therein is a multi-stage abutment, having two stages in the illustrated embodiment. The stages are formed by abutment faces that are arranged to contact particulate material in the transport channel, when the outlet abutment insert 800 is inserted into the receptacle of the housing 112. The outlet abutment insert 800 includes a first stage abutment surface 802 and a second stage abutment surface 804. The width dimension $W_1$ of the first stage abutment surface 802 (in the dimension corresponding to the axial direction of the disks, when the outlet abutment insert 800 is inserted into the receptacle) is smaller than the corresponding width dimension $W_2$ of the second stage surface 804. Other embodiments may include one or more additional stages of abutment surfaces, for example, of increasing width dimensions $W_x$.

When inserted into the receptacle of the housing 112, the outlet abutment insert 800 is positioned such that at least a tip portion 803 of the first stage abutment surface 802 is located upstream (in the direction of motion of the disks and particulate material during operation) with respect to the location of any portion of the second stage abutment surface 804. Accordingly, as particulate material is transported through the transport channel of the transporting apparatus 110, the particulate material will come into contact with the first and second stage abutment surfaces 802 and 804, and be redirected toward the outlet duct. Because the first stage abutment surface 802 located upstream of the second stage abutment surface 804, a portion of the particulate material transported through the transport channel (also referred to as a "transport facilitation zone") of the transporting apparatus 110 contacts the abutment surface 802 and is directed by that surface toward the outlet duct. However, because the first stage abutment surface 802 is thinner in width than the second stage abutment surface 804, a portion of the particulate material moving through the transport channel of the transporting apparatus 110 passes by the first stage abutment surface 802, but comes into contact with the second stage abutment surface 804 and is redirected toward the outlet duct by the second stage abutment surface 804. Accordingly, the multi-stage configuration of FIGS. 11-15, as embodied by the invention, may reduce localized loads on the outlet abutment insert 800 during operation by causing a portion of the particulate material to be effectively peeled off and redirected from the moving dynamic mass of particulate material in the transport channel by the first stage abutment surface 802 and then redirecting the rest of the particulate material by the second stage abutment surface 804.

In FIGS. 11-15, the outlet abutment insert 800, as embodied by the invention, comprises a unitary structure that may be made of any suitable material having sufficient strength, rigidity and durability, such as, but not limited steel, other metals, ceramic, combinations thereof, or the like. In other embodiments, a multi-stage outlet abutment insert may be configured as multiple, separate members that are inserted together or separately.

In a further embodiment, the outlet abutment insert 800 may be configured to be adjustable within the receptacle of the transporting apparatus, to adjust the position of the tip portion 803 of the first stage abutment surface 802 relative to the rotor hub or inner surface of the transport channel. Accordingly, in the event that the tip portion 803 of the abutment surface 802 wears over a period of operation of the transporting apparatus 110, the position of the abutment insert 800 may be adjusted to accommodate for such wear. For example, the outlet abutment insert 800 may be adjusted with the use of shims or wedge-shaped members that are inserted between the insert and a wall of the housing 112, a set-screw arrangement that fixes the outlet abutment insert 800 to the housing 112 at any one of a plurality of positions, or other suitable adjustment structure.

An outlet abutment insert 800 as illustrated in FIGS. 11-15 and described above may be employed in a single channel apparatus (a transporting apparatus having a rotor 118 with a single transporting channel). Alternatively, a plurality of outlet abutment inserts 800 as illustrated in FIGS. 11-15 and described above may be employed in a multi-channel apparatus (a transporting apparatus having a rotor 118 with multiple channels), where each outlet abutment insert 800 is associated with a respective one of the channels, on a one-to-one basis.

Figure 16:
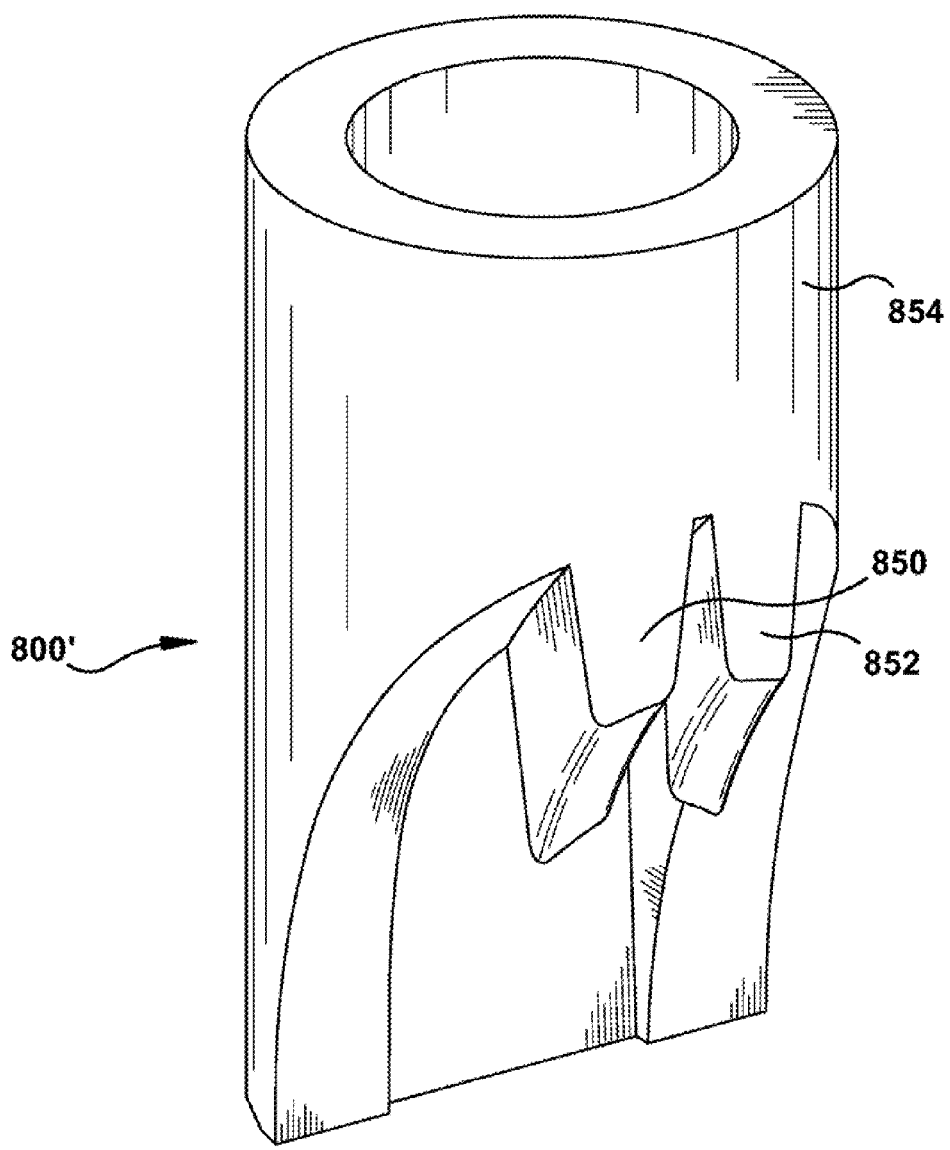
FIG. 16 is a perspective view of an outlet abutment insert according to an embodiment of the invention.

An embodiment of an integral outlet abutment insert and outlet duct structure 800' is illustrated in FIG. 16. The outlet abutment structure 800' in FIG. 16 is configured for a two-channel apparatus (a transporting apparatus having a rotor with two channels, such as, but not limited to, the rotor illustrated in FIGS. 25(a) and 25(b)). Accordingly, the outlet abutment structure 800' includes two abutment projections 850 and 852, one for extending into one of the two transport channels and the other for extending into the other of the two transport channels, when inserted into the receptacle of the transporting apparatus housing. A portion of the outlet abutment structure 800' is composed of a tubular shaped body 854, through which material exiting the transport channels during operation of the transporting apparatus may pass. The tubular shaped body 854 forms at least a portion of the outlet duct of the transporting apparatus. The outlet duct portion 854 may have a configuration in accordance with any of the outlet ducts described herein, including, but not limited to a single parallel duct, a single diverging duct, a single duct with a combination of parallel and diverging cross-sections, or a duct as described above with respect to duct 700 or 700'.

Figure 17A:
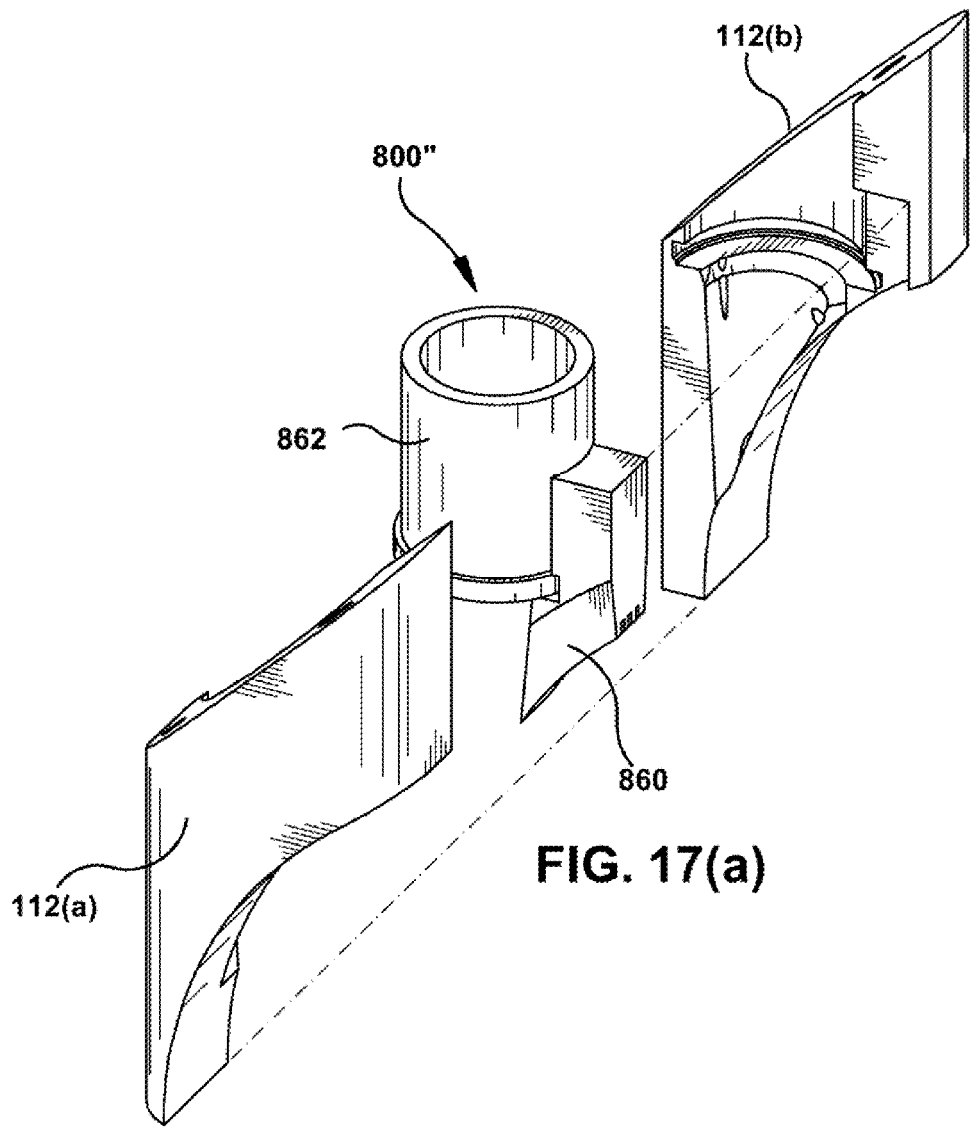
FIG. 17(a) is a perspective view of another outlet abutment insert according to an embodiment of the invention.
Figure 17B:
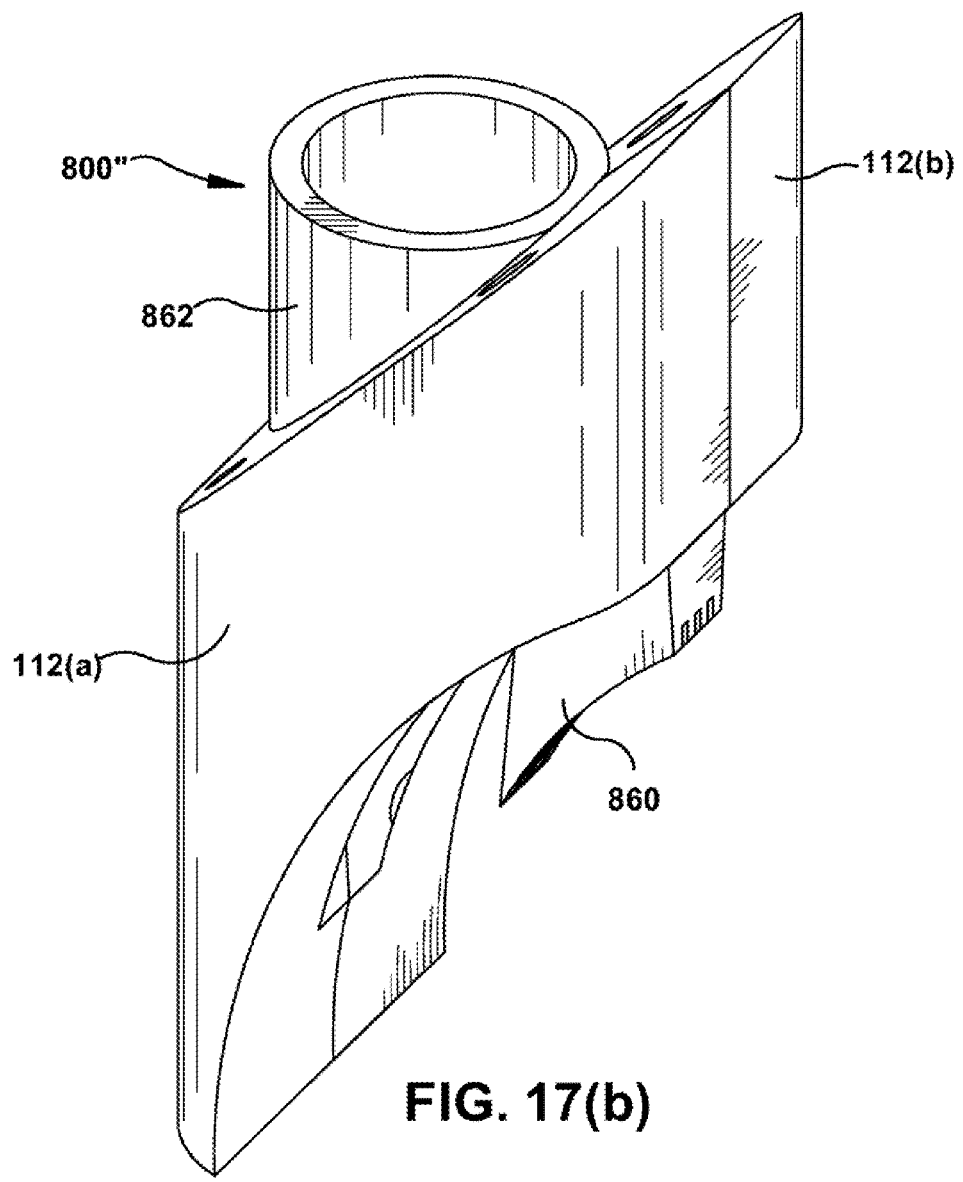
FIG. 17(b) is a perspective view of the outlet abutment insert of FIG. 17(a), within sections of a housing.

Another embodiment of an integral outlet abutment insert and outlet duct structure 800", as embodied by the invention, is illustrated in FIGS. 17(a) and 17(b). The outlet abutment structure 800" in FIGS. 17(a) and 17(b) is configured for a single channel apparatus (a transporting apparatus having a rotor with one channel). Accordingly, the outlet abutment structure 800" includes one abutment projection 860 for extending into the transport channel, when the outlet abutment structure 800" inserted into the receptacle of the transporting apparatus housing. A portion of the outlet abutment structure 800" comprises a tubular shaped body 862, through which material exiting the transport channels during operation of the transporting apparatus may pass. Accordingly, the tubular shaped body 862 forms at least a portion of the outlet duct of the transporting apparatus. The outlet duct portion 862 may have a configuration in accordance with any of the outlet ducts described herein, including, but not limited to a single parallel duct, a single diverging duct, a single duct with a combination of parallel and diverging cross-sections, or a duct as described above with respect to duct 700 or 700'.

Figure 18:
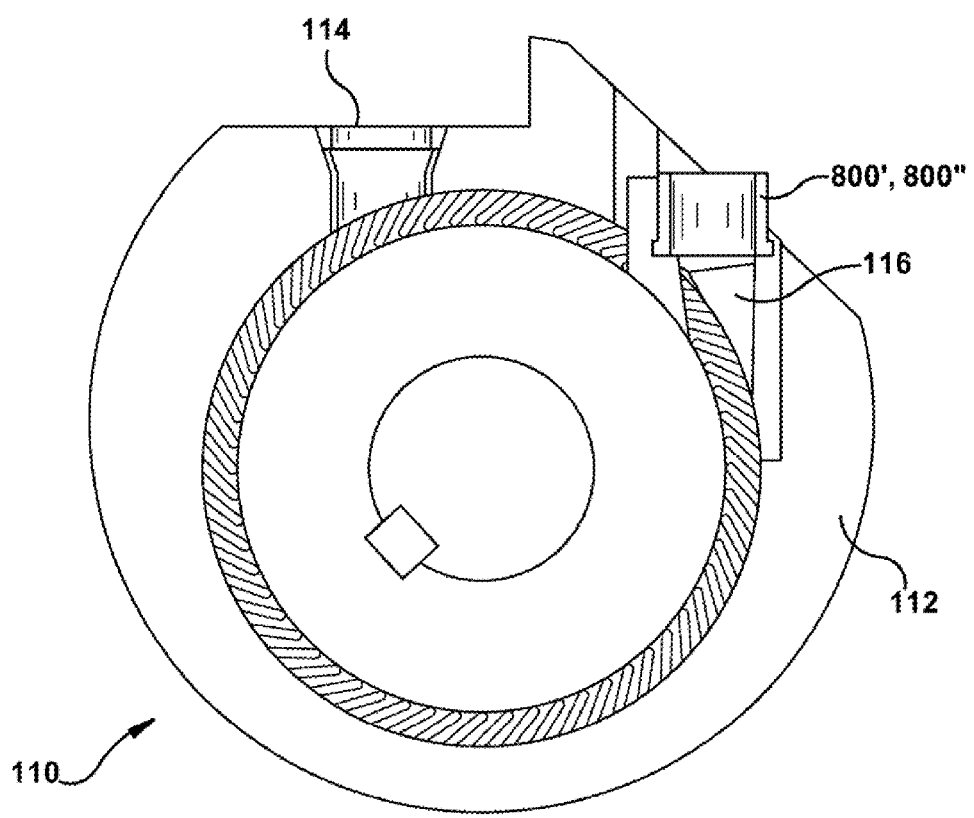
FIG. 18 is a cross-sectional view of an outlet abutment insert within a transporting apparatus according to an embodiment of the invention.

As illustrated in FIG. 17(a), the tubular shaped body 862 of the outlet abutment structure 800" is configured to fit within a volume space or receptacle formed between two sections 112(a) and 112(b) of the transporting apparatus housing 112. In one embodiment, the two sections of the transporting apparatus housing on either side of the outlet abutment structure 800" may be secured to each other (as illustrated in FIG. 17(b)) with suitable attachment structure that is capable of selective detachment to selectively detach one or both of the two housing sections 112(a) and 112(b) and allow selective removal or installation of an outlet abutment structure 800" from or to the volume space between the two housing sections 112(a) and 112(b). A transporting apparatus 110 is illustrated in FIG. 18 in a perspective, cross-section view, in which an integral outlet abutment insert and outlet duct structure as described above with respect to outlet abutment structure 800' or 800" is located within a receptacle in the housing 112 of the transporting apparatus.

Outlet Valve and Venting:

Rotary disk type transporting apparatuses, as embodied by the invention, may be configured with an outlet valve. Valves 108 and 112 in the outlet duct of a transporting apparatus are described in U.S. Pat. No. 5,402,876, issued Apr. 4, 1995 and titled Apparatus And Method For Transporting And Metering Particulate Material Into Fluid Pressure. In certain embodiments of the invention, such outlet valves (or other suitable outlet valves) may be configured to provide the capability of preloading material in the outlet duct, to allow the particulate material to become sufficiently compacted and compressed to form a seal against back pressure, for example, when the operation of the transporting apparatus 110 is stopped or slowed, or if other conditions result or could result in a leak of back pressure through the outlet duct occur or are detected.

A transporting system, such as, but not limited to, the system 100 illustrated in FIGS. 1(a) and 1(b) may include pressure valves and vents arranged at various locations along the transport path of the system. For example, a valve 750 may be located between the first and second hoppers 200 and 202, wherein the valve 750 may be selectively closed to inhibit the passage of back pressure of fluid or particulate material from the second hopper into the first hopper and selectively opened to allow flow of particulate material from the first hopper 200 to the second hopper 202. Similarly, a valve 752 may be located between the outlet conduit 400 and the vessel 300, wherein the valve 752 may be selectively closed to inhibit the passage of back pressure of fluid or particulate material from the vessel 300 into the outlet conduit 400 and selectively opened to allow flow of particulate material from the outlet conduit 400 to the vessel 300. In addition, one or more further valves 754, 756 may be provided in the second hopper 202 (or in the pressurizable container that holds the second hopper 202), in the vessel 300, in the transporting apparatus 110 or in the outlet conduit 400.

Such valves may be electronically controlled according to a instructions from an operator and/or an automated control program. One or more sensors may be located within the system 100, to detect and/or monitor pressure levels at various locations within the system. Pressure readings from such sensors or monitors may be provided to visual indicators (gauges or other suitable displays) and/or to an electronic processing system. The pressure readings may be used by an operator to determine valve control parameters. Alternatively or in addition, pressure readings may be used by the electronic processing system to determine valve control parameters. In some embodiments, the electronic processing system may be configured to provide valve control signals directly to the valves 750, 752, 754, and 756, in a feedback arrangement.

Additional feedback signals may be provided by sensors that detect torque on the rotor or rotor drive motor, sensors that detect motor power draw and/or EMF, sensors that detect gas or particle leakage. These feedback signals may be used to control motor power (for example, to maintain a constant or desired drive speed, and/or to adjust drive speed based on pressure readings), to control safety valves (to close valves to inhibit escape of back pressure or to open valves to vent pressure, as needed), or to control other aspects of the system.

Purge Gas Injection:

In certain contexts, it may be desirable to provide additional protection against the leakage of gas or other fluid from the pressurized environment, due to back pressure through the outlet duct and into the transport channel of the transporting apparatus 110. According to one embodiment of the invention, gas (or other fluid) injectors may be provided at appropriate locations along the transport channel and/or the outlet duct for the transporting apparatus 110.

The gas (or other fluid) injectors may be operatively connected (through suitable conduits) to a source of pressurized gas (or other fluid). In the event of a detection of a back pressure event (or the possibility of such an event) that causes or could cause a back leak of gas or other fluid from the pressurized environment, control electronics may be activated to cause the injection of pressurized gas (or other fluid) into the transport channel and/or outlet duct, upstream of any gas or other fluid that may leak in from the pressurized environment. The pressurized gas (or other fluid) may comprise, for example, an inert gas, such as nitrogen, or the like. The pressurized gas (or other fluid) may be introduced into the transporting apparatus at a sufficient pressure to overcome the back pressure and inhibit back flow leakage of gas (or other fluid) from the pressurized environment. In some embodiments, the transporting apparatus 110 may operate with a constant injection of fluid. In other embodiments, fluid may be injected, as desired, for example, in the event of a detection of a back pressure event or other purge condition.

Figure 19:
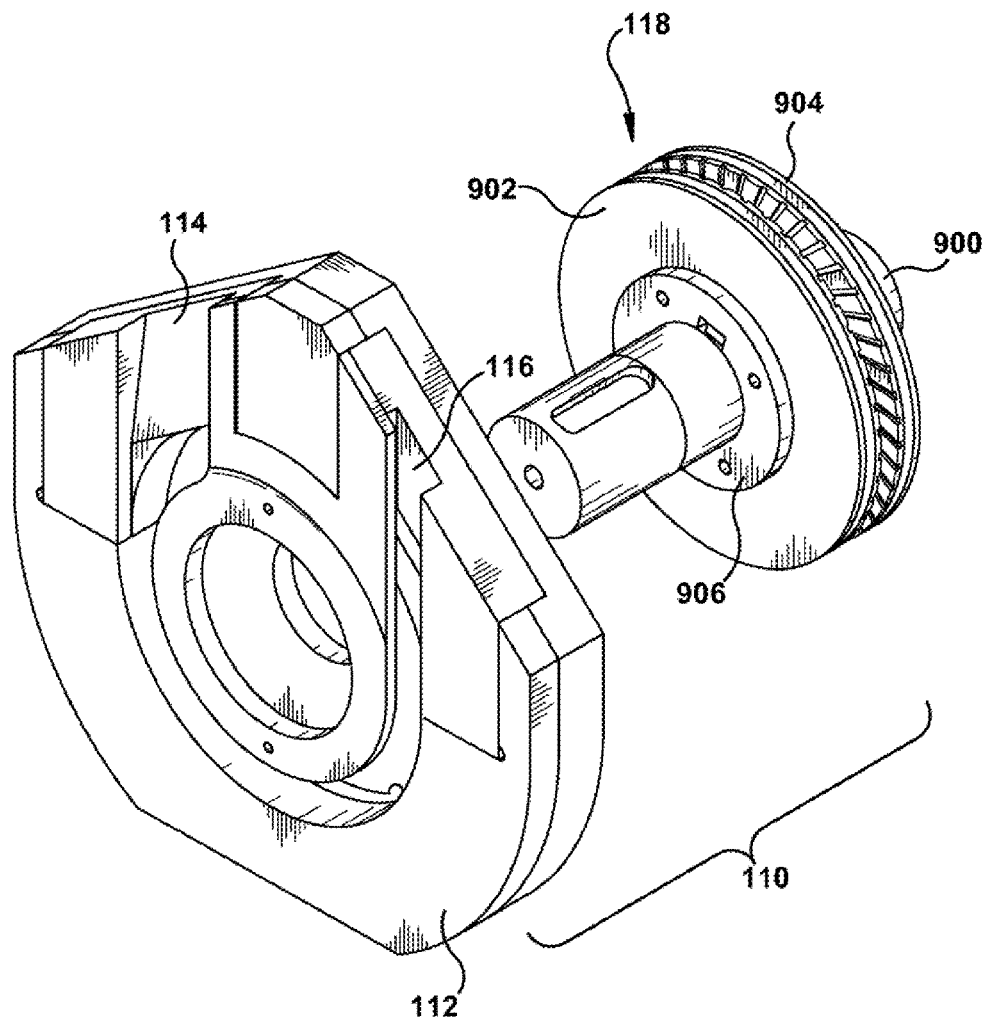
FIGS. 19 and 20 are a perspective view and a side view of a rotor configuration having a stationary hub in a transporting apparatus housing.
Figure 20:
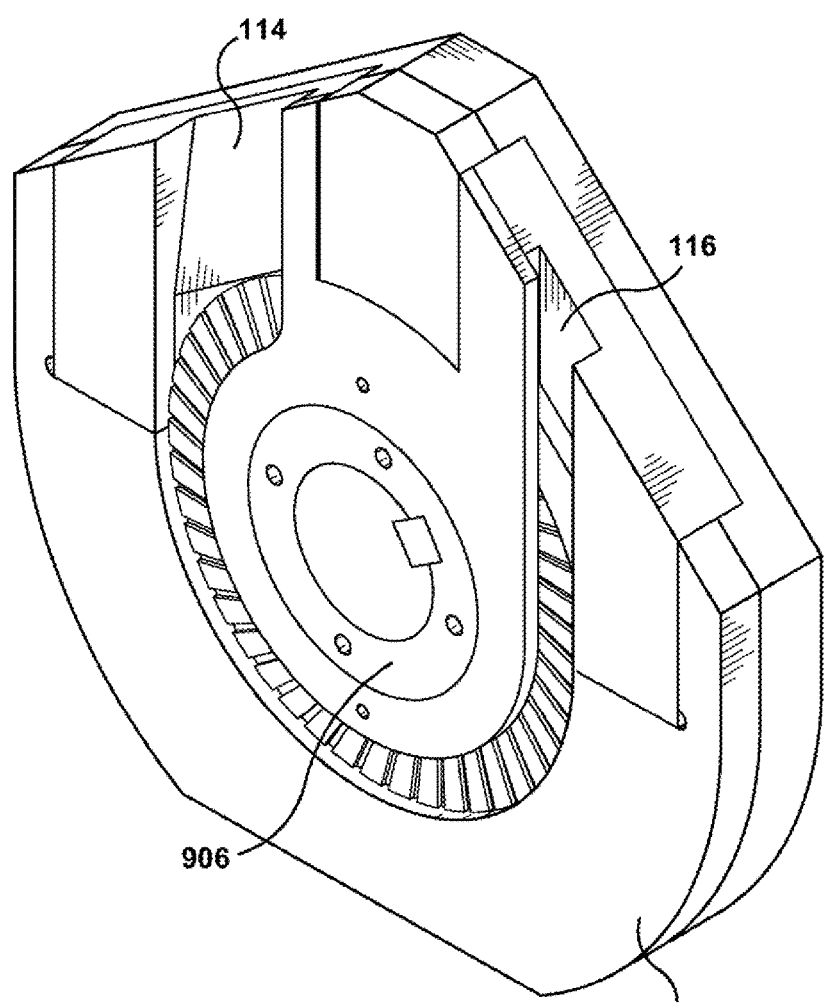

Stationary Hub Configurations:

A transporting apparatus 110 according to a further embodiment of the invention may employ a rotor configuration as illustrated and described with respect to FIGS. 19 and 20, wherein the rotor disks rotate relative to the hub of the rotor. Accordingly, the rotor is operated such that the hub remains stationary, while the disks are rotated relative to the hub and the housing 112.

More specifically, with reference to FIGS. 19 and 20, a rotor 118 is provided with a hub portion 900 and at least two disks 902 and 904. Each disk 902 and 904 has an engagement portion 906 for engaging a drive gear or other mechanism (not illustrated in the drawing) for driving the disk about its axis of rotation. The disks 902 and 904 are supported by the hub portion 900, but may rotate relative to the hub portion. Thus, during operation, the disks 902 and 904 are engaged with a drive source and are rotated about the longitudinal axis of the hub portion 900. However, the hub portion remains stationary. Accordingly, like the embodiments described above, the transport channel formed on two sides by the facing walls of the two disks 902 and 904, on a third side by a stationary wall of the housing 112 and on a fourth side by the hub.

However, unlike the embodiments described above, during operation of the transporting apparatus employing a rotor 118 of FIGS. 19 and 20, only the disk walls move and provide motive force for driving the particulate material through the transport channel(s), while the third and fourth sides of the transport channel (formed by the housing wall and the hub 900) remain stationary. The stationary wall of the housing 112 and the stationary portion of the hub 900 between the disks 902 and 904 frictionally engage some of the particles that are moved through the transport channel during operation of the transporting apparatus 110. By such frictional engagement, the housing wall and the hub provide a force that can enhance the compaction and compression of the particulate material within the transport channel. Such enhanced compaction and compression can improve the ability of the apparatus to hold back a back pressure and move particulate material across a pressure differential.

Figure 21:
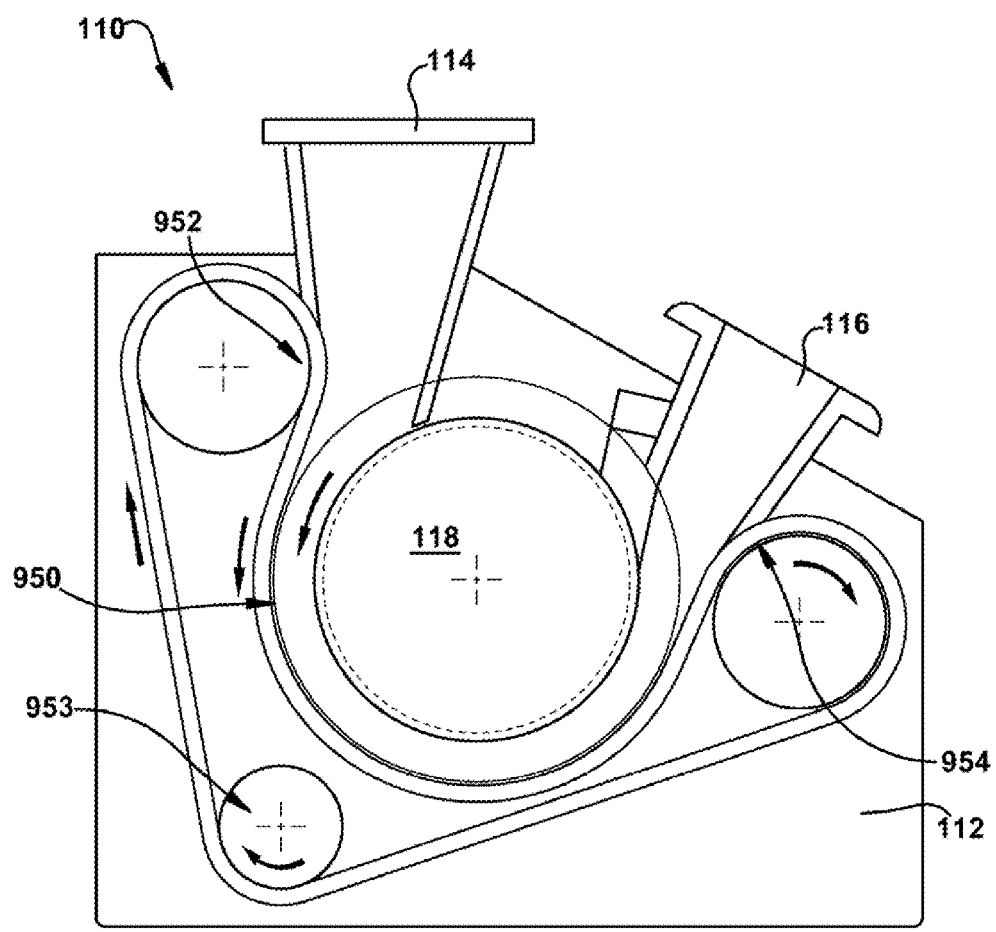
FIG. 21 is a cross-section view of a transporting apparatus having an endless belt configuration according to an embodiment of the invention.

Moving Wall Configurations:

A transporting apparatus 110 according to yet a further embodiment of the invention is described with respect to FIG. 21, wherein a moving wall is used instead of a stationary wall of the housing 112 on one side of the transport channel(s). In the embodiment of FIG. 20, an endless flexible belt 950 is used as the interior wall of the housing 112 that borders the transport channel(s).

The belt 950 may be supported by a plurality of pulleys or belt guides (three rotary pulleys are illustrated in the illustrated embodiment at 952, 953 and 954). One or more of the pulleys may be operatively coupled to a motor or other suitable drive source for rotation, to drive the belt and the other pulleys in the direction of the arrows. The pulley 952 helps to pull material into and compress the material in the transport channel of the rotor. The pulley 953 may be an idler pulley that can be adjustable, for adjusting the belt tension. Alternatively or in addition, the pulley 953 may be coupled to a drive source, as described above. The pulley 954 may be an outlet roller for providing an initial divergence of an outlet volume, while moving into the discharge area, to help discharge particulate material from the transport channel.

In some embodiments, the belt may comprise a flat or toothed (similar in general shape to an automobile timing belt). Other embodiments (such as embodiments requiring a relatively high drive power), the belt may comprise a chain-linked belt structure. The moving belt reduces friction and provides a static seal throughout the transport duct to reduce leakage.

The movement of the belt may help to pull particulate material into the pump and into the transport channel, with reduced friction and leakage. In addition, the belt movement may help material exit from the transport channel and into the outlet 116. Embodiments may be configured and controlled during operation such that the rotor 118 is drive while the belt 950 remains idle, or the belt 950 is driven while the rotor 118 remains idle, or both the rotor 118 and the belt 950 may be driven simultaneously.

A porous filter material and/or porous metal inserts may be provided on the inside diameter of the transport channel to allow venting throughout the flow path in the transport channel. As a result, the inlet may be de-aerated and leakage is vented back from the outlet. This can reduce the sealing requirements of the outlet plug (formed by the moving dynamic mass of material) and, thus, can improve the ability to transport particulate material across a greater pressure differential. If desired, screens may be provided behind the vents, to selectively extract material in selected locations.

Various aspects of the multiple embodiments described above may be employed independently or in combinations thereof. While particular embodiments of the invention have been illustrated and described, it will be obvious to those skilled in the art that the invention is not limited to the particular embodiments illustrated and described and that changes and modifications may be made without departing from the spirit and scope of the claimed invention.

We claim:

1. A material transporting system comprising:
    a material transporting apparatus comprising:
        a material transporting apparatus hopper structure comprising at least one rotary transporting apparatus, and a stationary hub structure constraining and assisting the at least one rotary transporting apparatus;
        an outlet duct configuration configured to permit material to exit therefrom, the outlet duct configuration comprising at least one diverging portion; and
    an outlet abutment configuration comprising a first stage abutment surface configured to direct material to the outlet duct configuration and a second stage abutment surface configured to direct material to the outlet duct configuration, the first stage abutment surface being located upstream of the second stage abutment surface in a direction of movement of the material during operation of the material transporting apparatus; and having a width dimension smaller than a width dimension of the second stage abutment surface;
    wherein material can be moved from the material transporting apparatus hopper structure to the outlet duct configuration through the at least one rotary transporting apparatus, and the outlet abutment configuration.

2. The material transporting system according to claim 1, further comprising a dust collection system.

3. The material transporting system according to claim 1, wherein the material transporting apparatus hopper structure further comprises at least two hoppers disposed upstream of the at least one rotary transporting apparatus.

4. The material transporting system according to claim 1, wherein the material transporting apparatus hopper structure further comprises at least one sensor for sensing at least one of voids and density.

5. The material transporting system according to claim 4, wherein the material transporting apparatus hopper structure further comprises at least one vibrator to vibrate the material transporting apparatus hopper structure and material therein.

6. The material transporting system according to claim 1, wherein the material transporting apparatus hopper structure further comprises pressurized destination environment to provide a buffer area to absorb back flow in the material transporting apparatus hopper structure.

7. The material transporting system according to claim 1, wherein the at least one rotary transporting apparatus comprises:
- a transport duct having an inlet, an outlet downstream of the inlet, and a primary transport channel connecting the inlet to the outlet, the primary transport channel being defined in part by a housing and a pair of opposed moving surfaces which are movable between the inlet and the outlet towards the outlet, at least one of the moving surfaces having a series of discontinuities, each of the discontinuities being configured to define a transport facilitation zone contiguous with the primary transport channel such that material within the transport facilitation zone is contiguous with material within the primary transport channel, each of the discontinuities having a downstream facing drive surface;
- a drive shaft coupled to the moving surfaces for moving the moving surfaces between the inlet and the outlet towards the outlet; and
- at least one seal to reduce the passage of dust and debris from the primary transport channel, while allowing the moving surfaces to rotate relative to the housing.

8. The material transporting system according to claim 7, wherein the at least one rotary transporting apparatus comprises at least two disks which define the two moving surfaces.

9. The material transporting system according to claim 7, wherein the at least one seal each comprises a seal element and an annular bracket holding the seal element, the annular bracket having a generally L shaped cross-section.

10. The material transporting system according to claim 7, wherein the at least one seal each comprises an annular seal member disposed in an annular groove defined by an outer peripheral of a respective disk, the annular seal member extending outwardly from the outer periphery of the respective disk and engaging a wall of the housing for sealing a space between the respective disk and the wall of the housing.

11. The material transporting system according to claim 10, wherein the annular seal member comprises arc-shaped sections with overlapping extension portions.

12. The material transporting system according to claim 7, wherein the at least one seal each comprises an annular bracket supported by the housing and a brush element supported by the annular bracket and extending into a space between and in contact with a wall of the housing and an outer peripheral of a respective disk for sealing the space, the brush element being disposed substantially parallel to an axis of rotation of the respective disk.

13. The material transporting system according to claim 1, wherein the outlet duct configuration comprises at least one parallel section.

14. The material transporting system according to claim 1, wherein the outlet duct configuration comprises multiple outlets, wherein at least one of the multiple outlets comprises diverging cross sections.

15. The material transporting system according to claim 1, wherein the outlet abutment configuration comprises a material selected from the group consisting of metals, ceramics, and combinations thereof.

16. The material transporting system according to claim 1, wherein the outlet abutment configuration comprises an adjustable outlet abutment configuration.

17. The material transporting system according to claim 1, wherein the at least one rotatory transporting apparatus comprises a transport duct having an inlet, an outlet downstream of the inlet, and a primary transport channel connecting the inlet to the outlet, the primary transport channel being defined in part by a housing and supported around a plurality of pulleys.

18. The material transporting system according to claim 1, wherein the material transporting apparatus further comprises an outlet valve assembly disposed at an exit of the outlet duct configuration.

19. The material transporting system according to claim 1, wherein the first stage abutment surface and the second stage abutment surface are not parallel to each other.

* * * * *

UNITED STATES PATENT AND TRADEMARK OFFICE
CERTIFICATE OF CORRECTION

| | | |
|---|---|---|
| PATENT NO. | : 8,006,827 B2 | Page 1 of 1 |
| APPLICATION NO. | : 12/565269 | |
| DATED | : August 30, 2011 | |
| INVENTOR(S) | : Derek Leslie Aldred et al. | |

It is certified that error appears in the above-identified patent and that said Letters Patent is hereby corrected as shown below:

In Column 24, Line 37, in Claim 17, delete "and" and insert -- and a belt --, therefor.

Signed and Sealed this
Third Day of January, 2012

David J. Kappos
*Director of the United States Patent and Trademark Office*